April 21, 1959 J. W. CORNWELL ET AL 2,883,106
DATA STORAGE AND RESERVATION SYSTEM FOR TRAVEL ACCOMMODATIONS
Filed Aug. 10, 1953 11 Sheets-Sheet 1

Fig. 1.

INVENTORS
JOHN W. CORNWELL
MERTON L. HASELTON
EDWIN L. SCHMIDT
BY
ATTORNEY

April 21, 1959  J. W. CORNWELL ET AL  2,883,106
DATA STORAGE AND RESERVATION SYSTEM FOR TRAVEL ACCOMMODATIONS
Filed Aug. 10, 1953  11 Sheets-Sheet 4

INVENTORS
JOHN W. CORNWELL
MERTON L. HASELTON
EDWIN L. SCHMIDT
BY
ATTORNEY

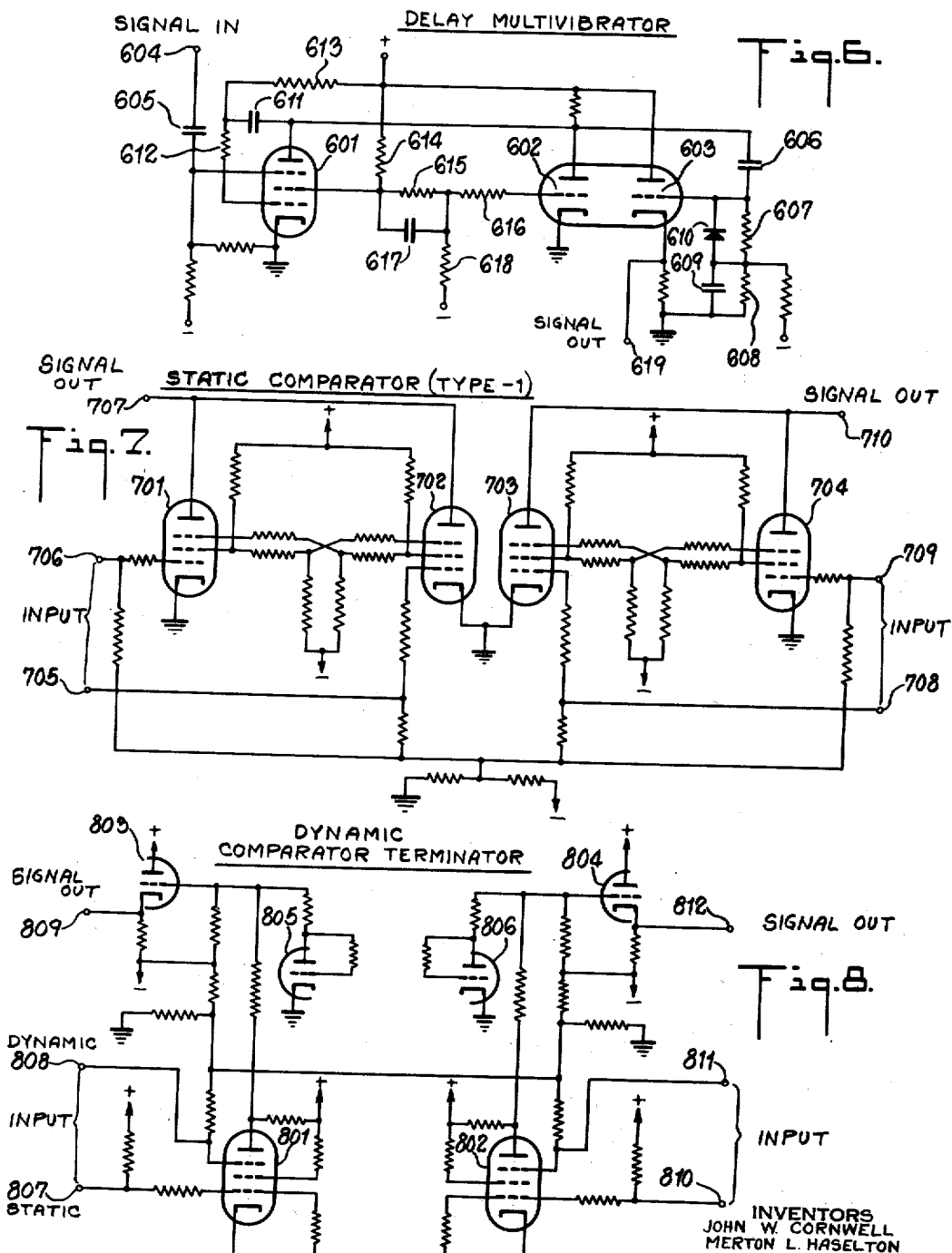

April 21, 1959  J. W. CORNWELL ET AL  2,883,106
DATA STORAGE AND RESERVATION SYSTEM FOR TRAVEL ACCOMMODATIONS
Filed Aug. 10, 1953  11 Sheets-Sheet 6

INVENTORS
JOHN W. CORNWELL
MERTON L. HASELTON
EDWIN L. SCHMIDT
BY
ATTORNEY

April 21, 1959   J. W. CORNWELL ET AL   2,883,106
DATA STORAGE AND RESERVATION SYSTEM FOR TRAVEL ACCOMMODATIONS
Filed Aug. 10, 1953   11 Sheets-Sheet 7

EITHER GATE-DYNAMIC

STATIC COMPARATOR TERMINATOR

OUTPUT FOR
→ AGREEMENT
→ DIFFERENCE
(WHEN INPUT VOLTAGE IS HIGH)

INVENTORS
JOHN W. CORNWELL
MERTON L. HASELTON
EDWIN L. SCHMIDT
BY
ATTORNEY

INVENTORS.
JOHN W. CORNWELL
MERTON L. HASELTON
EDWIN L. SCHMIDT
BY
ATTORNEY

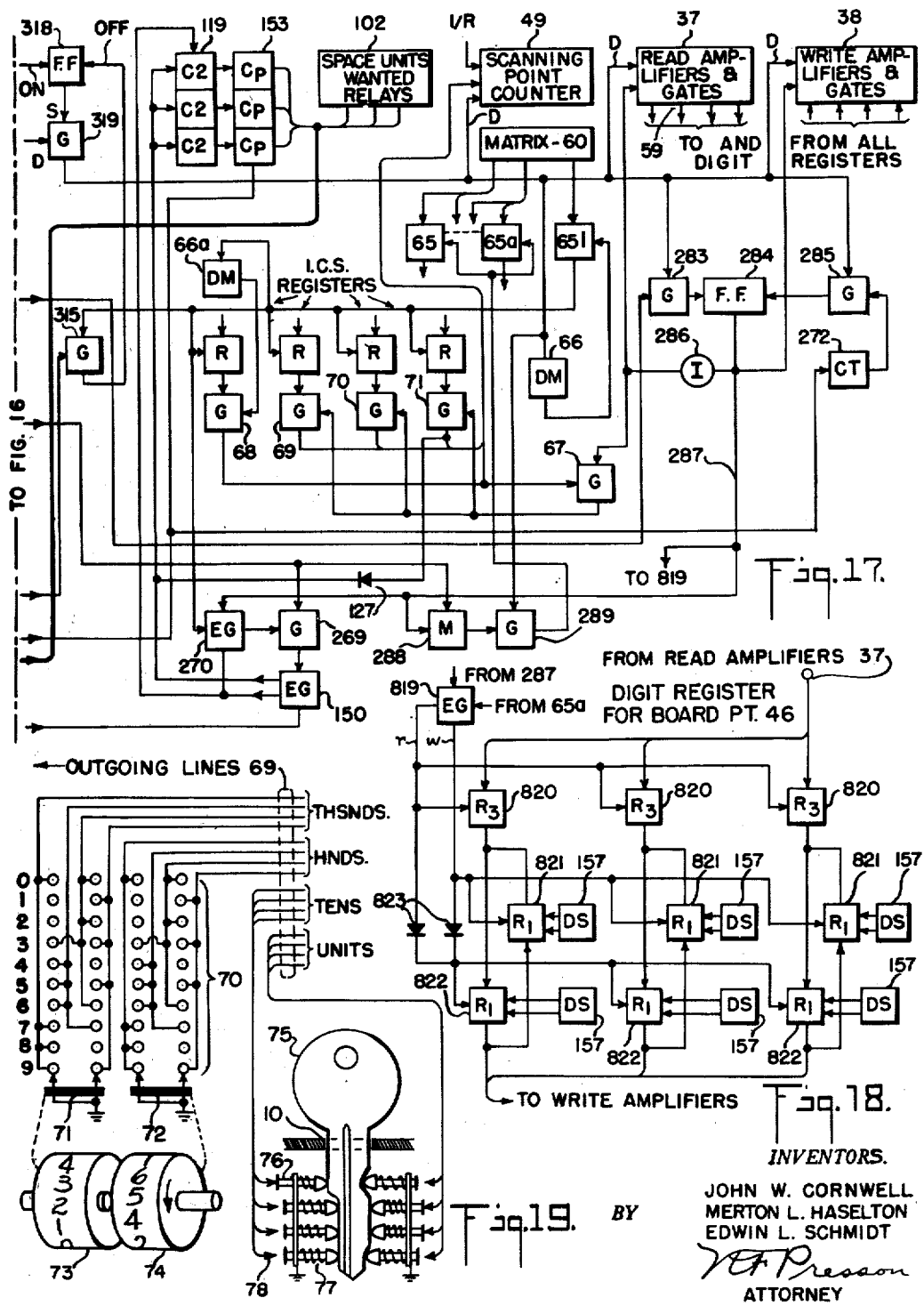

# United States Patent Office 2,883,106
Patented Apr. 21, 1959

2,883,106
DATA STORAGE AND RESERVATION SYSTEM FOR TRAVEL ACCOMMODATIONS

John W. Cornwell, Garden City, Merton L. Haselton, Rye, and Edwin L. Schmidt, Croton-on-Hudson, N.Y., assignors to The Teleregister Corporation, New York, N.Y., a corporation of Delaware Application August 10, 1953, Serial No. 373,292

25 Claims. (Cl. 235—61.6)

This invention relates primarily to a data storage system for train or other transportation accommodations. The equipment for such a system preferably includes telecommunication signaling apparatus with sending and receiving control units which may be located singly or in groups at various convenient stations, and a central station at which a detailed inventory is maintained respecting numerous accommodations on scheduled trains or other conveyances the departure dates of which may extend over a period of many days, say, a month. In order to meet the practical needs of such a system, it is desirable or necessary to treat each space unit separately, rather than to group them as a quota of space units any one of which may be allotted to a particular passenger, as is commonly done when reserving seats on an airliner. Each space unit on a train must also be identified as of a particular category, that is, a chair, a berth, a drawing room, etc., and its location in a certain car of the train must be included in the information to be derived from the inventory when the agent does business with a customer.

The medium for data storage is preferably of the type having one or more continuously rotatable magnetic drums. On each drum, data-recording channels are arranged and adapted to be scanned by electromagnetic read-record heads.

In a copending application of John J. Connolly et al., Ser. No. 232,548, filed June 20, 1951, and entitled "System for Magnetic Storage of Data," and assigned to the assignee of the instant application, there is described a data storage system of somewhat similar nature, the disclosure of which case is incorporated herein by reference. Many of the techniques which have been developed for handling airline reservations, as disclosed in said Connolly et al. case have been adopted for implementing the present invention. Many new techniques, however, will be found in the instant disclosure.

A primary object of our invention is to provide a combination of essential components in a reservation system which will serve to maintain a quick-access inventory of individual space accommodations of different categories on Pullman cars, steamships, or other conveyances.

Another object is to provide means for obtaining a read-out of selected items of information from a magnetic storage medium, where the items are specific as to date, train, car and category of accommodation.

Still another object is to provide means of access to different portions of a recording channel for writing in new information relative to a number of different items to be processed.

Again it is an object to provide flexibility of utilization of certain programming equipment, whereby the reservation system may be employed to store and to manifest a multiplicity of data items, any particular item or group of items being selected at will for current processing.

Further objects include (a) the provision of means for making comparisons between the informational content of magnetically stored items and externally supplied information data; (b) the provision of means for scanning a magnetic inventory to locate a wanted number of adjacent accommodation units; and (c) to provide self-adjusting programming equipment such that while a scanning operation is in progress certain steps may be taken under directives which originate automatically with the read-out of the data being scanned.

Other objects of our invention will be brought out and will be apparent as the disclosure is developed hereinafter. The advantages of the invention will also be better understood as the reader gains familiarity with the nature of the detailed disclosure.

The invention will now be described in sufficient detail to give those skilled in the art a clear understanding thereof. Reference is hereinafter made to the accompanying drawings, of which Fig. 1 shows in perspective an agent's keyset for gaining access to the common equipment and for receiving information regarding the status of any desired detail of the inventory record as kept on revolving drums. This keyset is also useful for posting new data on specified portions of the recording channels;

Fig. 6 is a circuit diagram of a delay multivibrator;

Figs. 7 and 8 are circuit diagrams of two different types of comparator circuits;

Figure 14:
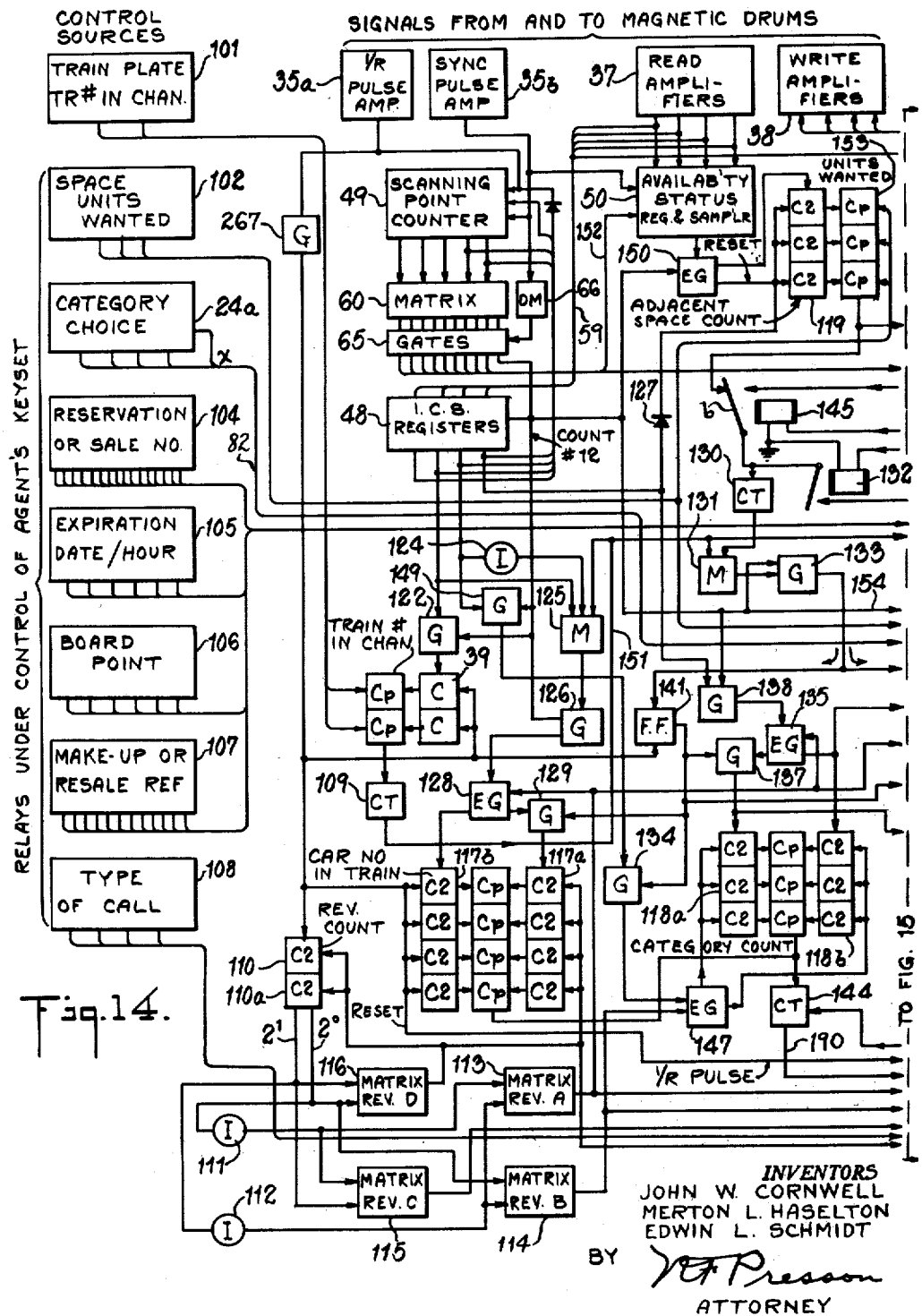
Figure 15:
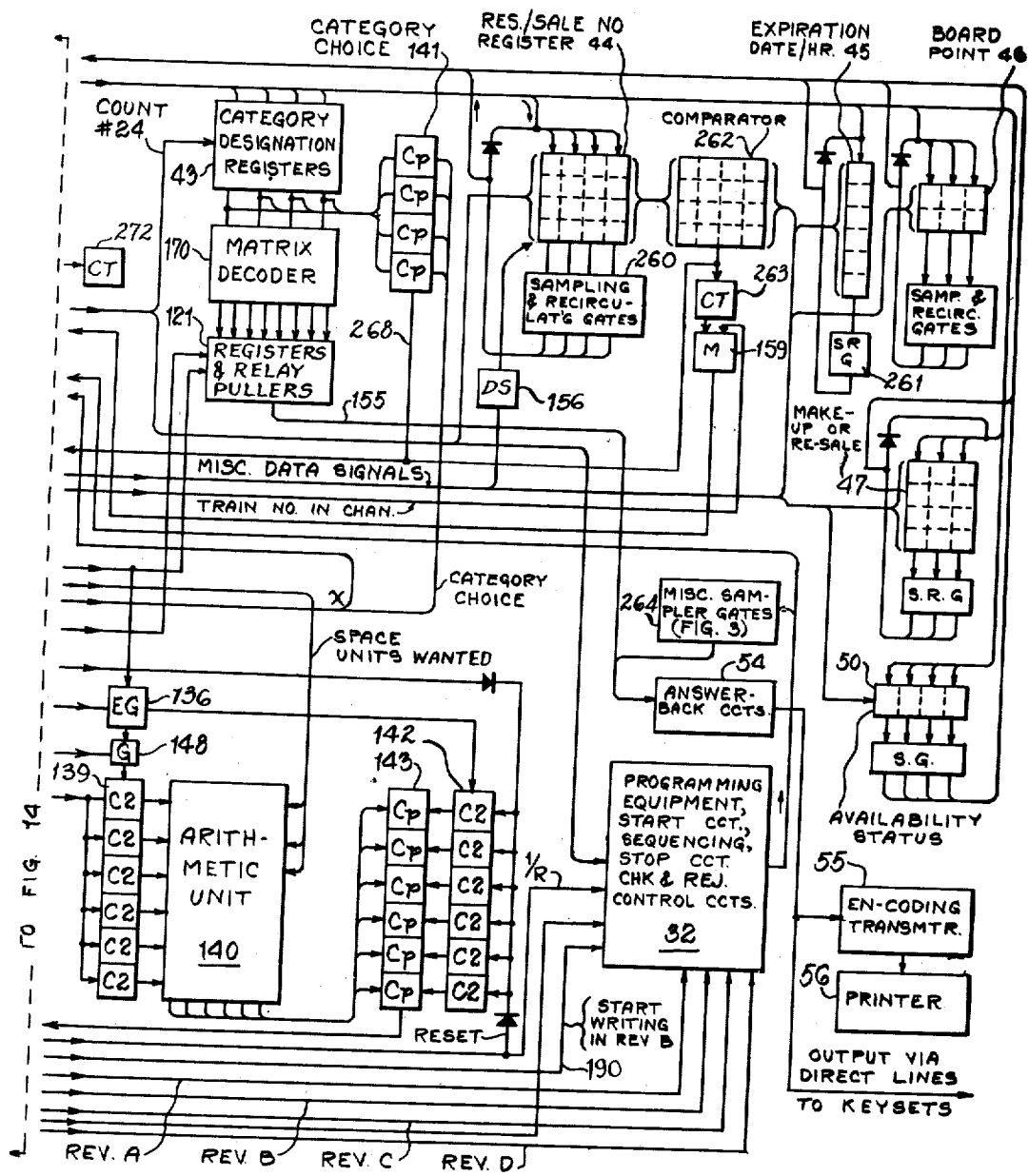
Figure 16:
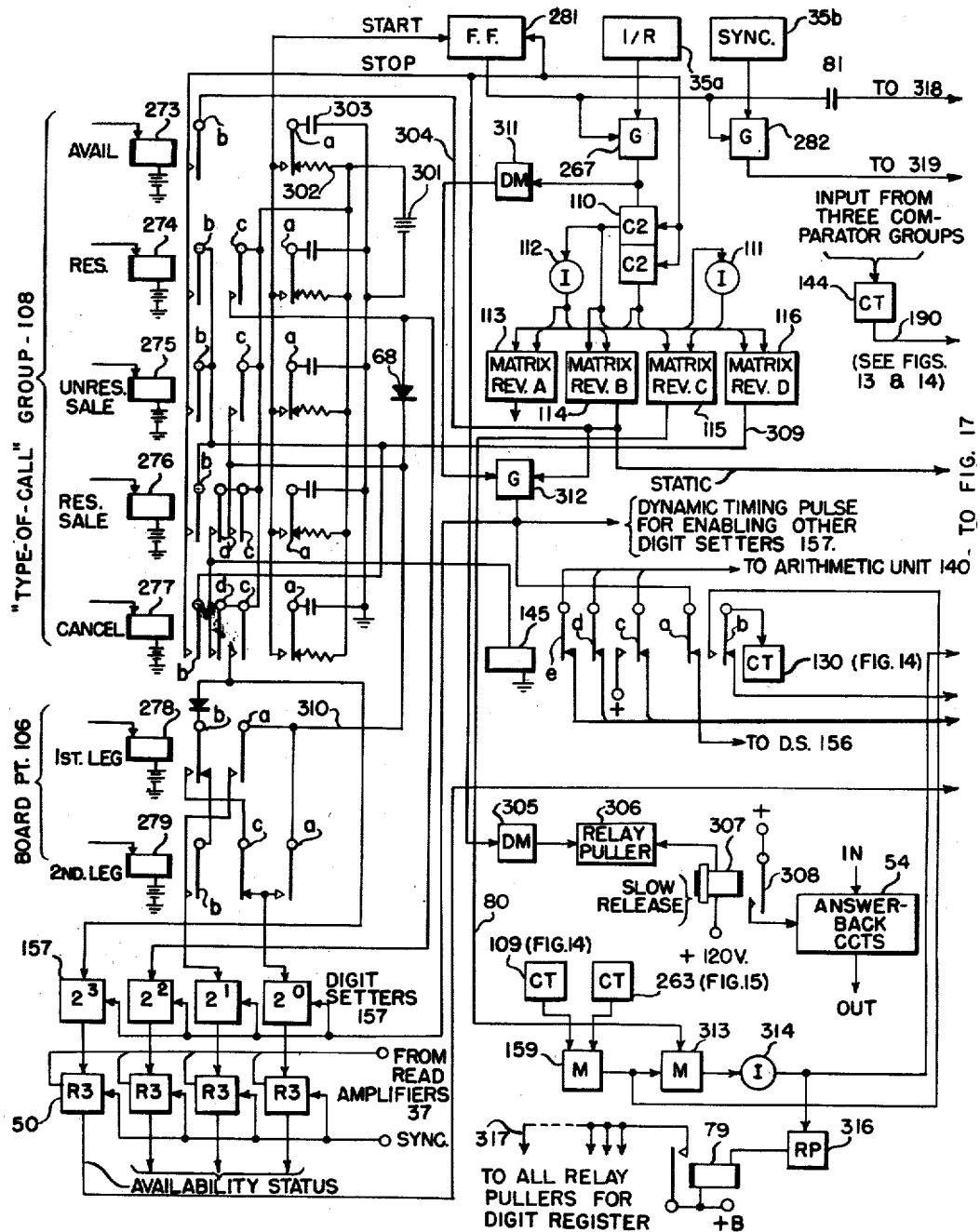

Figs. 14 and 15 when placed side by side show a comprehensive circuit diagram which is referred to in explaining various operations of the system;

Figs. 16 and 17, when placed side by side constitute a block diagram showing components of a programming section of our system;

Fig. 18 shows a circuit detail covering means for re-iterative recording of statistical data; and Fig. 19 shows certain details of the agent's keyset, particularly a stepping switch structure and additional keying means for composing permutative signals to represent identification numbers of transactions.

General aspects of the system

In order to direct the reader's attention as much to the general aspects of the invention as to the more minute details of the components which must be described for the purpose of completing the disclosure, a brief survey of our improved apparatus and its mode of operation will next be presented.

The illustrative embodiment of our electromagnetic inventory or "reservisor" system disclosed herein is designed to handle traffic and inventory data storage for trains running both ways between two terminals of a railroad. Reservations will be made and tickets sold for different portions of the route. So, there is a need for designating different boarding points, and in some cases, for assigning space to a second passenger who is to board the train at some point at or beyond the destination of the first passenger.

The train schedule for outgoing trains from only one terminal, and the equipment necessary to maintain the inventory for space reservations on those trains, may be considered as substantially duplicated for the schedule of trains outgoing from the other terminal. Pullman car accommodations are not usually provided on local or commuter trains, so need not be here considered. It will, therefore, be sufficient for the purposes of this disclosure to describe a system which handles through traffic on trains going one way out of a given terminal and picking up passengers at different way stations as well as at that terminal.

The diagram or inventory of available reservation space of different classes, for example, drawing rooms, compartments, berths and seats, for each train is initially stored on rotating magnetizable storage drums by means of discrete magnetized spots, this information being recorded on the drums by means of signal circuits controlled from master stations. The signals comprising this information, which can be regarded as a diagram for each train, may be transmitted either by manipulation of keys at the master keysets or may be transmitted automatically, such as from a perforated tape by means of a tape transmitter. The information may be changed, whenever required, by the master station. It initially includes rows of magnetically stored signals (in the direction in which scanning of the rotating drum occurs), and these signals represent the train number, the various classes or categories of accommodations on the train, the numbers of the individual cars which make up the train, signals representing the categories of accommodations in each car, and index control signals each of which follows a group of eleven successive rows which are provided for the entry of reservation information by the various ticket selling agents.

Each ticket agent has a keyset that controls circuits by means of which he can make a space availability check of the recorded diagram to determine what categories of accommodations are available for a particular train on a particular date (within a limited period, such as the ensuing thirty days). Alternatively he can determine whether a desired number of adjacent units of a given category is available. Assuming that the desired space is available, the ticket agent can insert signals which will reserve such space up to a predetermined expiration time. The agent can insert signals to indicate that a particular space is sold, with or without a previous reservation having been made. Where a reservation was previously recorded by the agent his equipment can locate the record pertaining to that reservation either for effecting a sale or a cancellation of the reservation.

The master agent posts a new diagram for the thirtieth day in advance to take the place of the diagram for the train which has departed. The master agent also can obtain a detailed readout of the condition of any posted train diagram at any time and have it printed on a card or tape for his own information and also to furnish a diagram for the use of the train or Pullman conductor prior to the train departure.

The basic data for the train diagrams initially is recorded by means of discrete magnetized spots (referred to in the art as "bits") on magnetic drums, for all trains having reserved space and for the ensuing four weeks or a month. Each space unit, treated separately as an inventory item, requires storage capacity of twelve successive rows of four digits each thereby to accommodate up to 48 binary digits, or bits. We prefer to utilize four adjacent parallel tracks circumferentially around the drum to record such an item. There are twelve serially arranged bits per track which are appropriate to each space unit record. A single drum accommodates a considerable number of channels, each channel consisting of four tracks.

For a particular installation now considered to be representative it is necessary to provide at least seven drums each 16" in diameter and 18" in axial length, running at 1200 r.p.m. Based on past experience it is practical to use a packing factor of 80 bits per inch linearly of each record track, the tracks being spaced 1/16" from center to center. Each drum then has a storage capacity of at least one million bits. One of the seven drums at a given terminal (for one-way traffic) is to be kept in operational reserve for standby or overhaul maintenance.

Communication facilities for operating the input and output devices of the inventory system will in practice include a number of keysets, teleprinter equipment and seeker switching means. The seeker switch is used in known manner for enabling one only of the keysets to be connected with the common equipment at any one time, all other keysets being locked out until a call has been completed. From local keysets a call could be completed in less than one second except that additional time amounting to about 3.5 seconds is needed by the teleprinter to read back and print an item. Remotely located agents' sets are provided with code converter devices so that their signals may be transmitted to the common equipment in ordinary 5-unit teletype code. A message covering an availability inquiry, for example, can be set and answered within about 8.5 seconds, using a teleprinter channel.

Automatic and error-proof coding of certain portions of the call signals is facilitated by the use of code plates such as disclosed in Patent 2,564,410, which was granted August 14, 1951, to Edwin L. Schmidt. As slightly modified for use in our train reservisor, each train plate is designed to accommodate 16 train selections. Both sides of the plate are used, each side having eight plots of space accommodations, each plot pertaining to a particular train. When the plate is dropped into a slotted receptacle 22 of the agent's set (Fig. 1), the code elements of a signal for selecting a record channel for scanning a particular train schedule are composed in a negative sense by the notches in the bottom edge of the plate as inserted in the slot. This signal is supplemented by a signal from the date keys, whereby the drum and channel containing the wanted train schedule is selected.

A shutter 23 in front of the slot for the train plate is movable up and down in order to expose one line of train data while concealing such data as it relates to unwanted train diagram. This shutter is mechanically coupled to a coding switch which completes the selection coding. Other selections are made by inserting other edges of the plate into the slot and by turning the opposite side of the plate to face the operator. In this way it requires a minimum number of plates to make any one of numerous train diagram selections.

Master agent sets loacted at supervisory positions in each terminal are used to set up the initial recording of all the plots of space designations according to their categories for different trains and different dates of departure. From the master agent's set, calls may be put through for processing cancellations in view of a clerically kept waiting list, also for correcting the inventory or train diagram in other respects, and for causing a printout of each train diagram with its ticket numbers for each space that has been sold. Such a diagram is used by the conductor of the train, who picks it up just prior to departure.

The magnetic drums and associated equipment are arranged for selective operation of different scanning functions either to write in or to read out any information that is within the scope of a particular call. The drums run continuously at a nominal speed which need not be exactly regulated. The phase relation between any two drums is of no moment since, by means of relay selection in response to any particular call, only one drum is chosen to perform its function. Each drum is provided with its own synchronizing channel for generating gating or counting pulses and thus serves to find coincidence in any search for individual item recordings.

Numerous transient storage devices, such as electronic shift registers are included in the central office equipment. These are brought into play selectively under control of keys in the keyset, and by means of signal-responsive relays. Different functions are, therefore, performed by the common equipment, depending upon the relay selection. The programming of a particular type of call is determined by that relay selection.

The following operations may be performed at different times according to the needs for handling the traffic:

From agents' sets:
(1) Space availability check.
(2) Reserve single space or up to 5 adjacent spaces.
(3) Sell space.
(4) Cancel space previously reserved or sold and restore the signals which designate availability.

From master agent's sets:
1, 2, 3 and 4 as above.
(5) Read total space count by category status and by car number or train number.
(6) Write new diagrams of trains for a future date in place of that for the last elapsed date.
(7) Reserve by specific identification of space.
(8) Sell by specific identification of space.
(9) Read and cancel expired reservations.
(10) Read and print train lists including sale numbers for specific spaces.

*The agent's keyset*

Fig. 1 shows a preferred keyset design for use by a ticket agent. A master agent's set employed is of similar design but has more keys and indicator lamps. These keysets have been described above in general terms, and it has been mentioned that they are built, with minor modifications, according to the disclosure of Schmidt Patent 2,564,410. For our purposes, however, it is necessary to add certain features not shown by Schmidt. Thus we provide a receptacle 10 for an agent's key having a dual function. The unauthorized use of the keyset is prevented by disabling the circuits if the key is not inserted. Also, the contacts (not shown) which are permutatively actuated by different agents' keys serve to transmit signals to the common equipment so as to identify on the magnetic storage drum the agent who initiates the call.

The agent's two-digit number, furthermore, represents the higher of four digits of a reservation number or sale number. A reservation number which identifies a particular space on the inventory record includes the two digits selected by the agent's key and two lower-space digits, the permutation signals for which are supplied from contact banks of a stepping switch operatively associated with a counter 11. The stepping switch is advanced step by step upon each successive manipulation of either of the two keys 26 and 27 in any suitable manner known in the art.

When putting through a call to record a reservation, the agent's key inserted in the key-hole 10 cooperates with the stepping switch that is coupled to the counter 11. Together they cause code signals to be transmitted and suitably recorded to indicate the space assignment. When that assignment is thereafter to be referred to, say, for recording the sale of a ticket to the passenger, the location of the space unit recording on the channel can be found by a setup of the keys 12 to correspond with the reservation number. The date keys 14 must also be set to correspond with the date of the train on which the reservation was originally made, and the train plate 21 must also be inserted to identify and locate the recording in the proper channel.

This type of call, as well as a call dealing with a cancellation, involves three drum revolutions or scanning cycles, of which in revolution A coincidence is established between the magnetically recorded reservation number and the set-up of the same by the keys 12. The reservation number is read out and stored in a shift register during four successive clock pulses, coincidence being established at the instant of the fourth pulse.

The numerical count of that pulse from the certain starting points during drum revolution is then temporarily stored, since it is needed in the processing of this call during revolutions B and C, wherein the same space record is repeatedly located.

Revolution B is used to record the sale of a reservation previously made or a sale without previous reservation, and also to record a new code signal (availability status) for designating the status of the space unit as sold rather than reserved. The signal representing the reservation number is composed of two lower-order digits derived from the agent's key in the key-hole 10; also two higher-order digits derived from the then setting of the stepping switch that is coupled to counter 11. Revolution C completes this call by a read-out of all the information respecting the reserved space unit.

The date keys 14, and keys 15 which designate the number of space units wanted, are used in much the same way as is described in the aforementioned Connolly et al. application. For space reservations on trains it is important to restrict the customer to a limiting date or hour within which to pick up his ticket. Keys 16 are used for designating the units digit of a day or hour. An expiration hour is designated by selecting one of these keys together with a tens key 18. If the reservation is made for a day beyond the current day, then a tens key 18 and a units key 16 in combination will signfy the day of the month on which the reservation will expire. The three keys 19 headed "Make-up" are used to designate coded instructions for the porter. They can be set up in seven different permutations to specify make-up instructions regarding bedrooms, drawing rooms, compartments, and one or both berths of a section.

If the space assignment is located in a chair car, the passenger may want to leave the train at some way-station. Then if his destination is not more than half way to the remote terminal, the space may be reserved or sold for occupancy beyond the first passenger's destination. In this case there is no need for "make-up" data as such; so the keys 19 may be used for indexing the location of new reference data concerning the second passenger's reservation or ticket number. Recording channel space is to be provided for such needs additional to the normal requirements.

The row of keys 20 is used to designate the boarding point at which the passenger is to start his trip. The signal to be transmitted by any selected one of these keys consists of two 3-unit codes for which bit space is provided as shown in rows 23, 22, 21 and 20 of Fig. 9. A readout of this signal when wanted can be had with conventional decoding means, as will be discussed hereinafter.

Directly in front of the train plates slot in the agent's set, and in alignment with the designation divisions 13 on the shutter 23, is a row of combination lamp and push key assemblies 24 which are operable to deal selectively with the various categories of space available on any train. For example, "Upper," "Lower," "Roomette," etc., may be designated. These keys are not needed for an availability search, but only to specify the category wanted when making a reservation or sale. On an availability search all categories are interrogated during one revolution of the drum, and lamps underneath the translucent spots of keys 24 are lit by the answer-back circuits to show available space in the different categories, provided there are sufficient adjacent accommodations to satisfy the number wanted, as indicated by selection of one of the keys 15. In selling the space, however, the category of that space is specified by depression of the proper category key 24.

Three signal lamps are mounted beneath colored crystals at positions 28, 29 and 30 and have conventional functions in an answer-back system. Thus, if an availability search shows affirmatively that space is available, or that a sale or cancellation order has been successfully executed, then lamp 28 marked "CHK" will be lit. If the operator sets up erroneously an unlisted date, or otherwise makes an error of key-set operation, this will be automatically indicated by the lighting of lamp 29. If a sale is attempted when no space is available the lamp marked "REJ" will be lit.

Two lever-type non-locking keys 25, 26, and a push-button key 27 are used for initiating different calls or orders. Key 25 when pulled initiates an availability search. When pushed upward it merely clears the keyboard, like the error key of an adding machine. Key 26 when pulled starts a certain programming operation for the execution of a reservation order as above described. Key 26 when pushed upward starts a suitable programming operation covering the cancellation of a held reservation prior to the sale thereof; or covering the cancellation of a ticket sale.

The programming of a sale order is likewise accomplished by depressing key 27. A detailed explanation of how different orders are programmed and executed will be given along with details of the electronic components.

*Coordination of the basic components*

Figure 2:
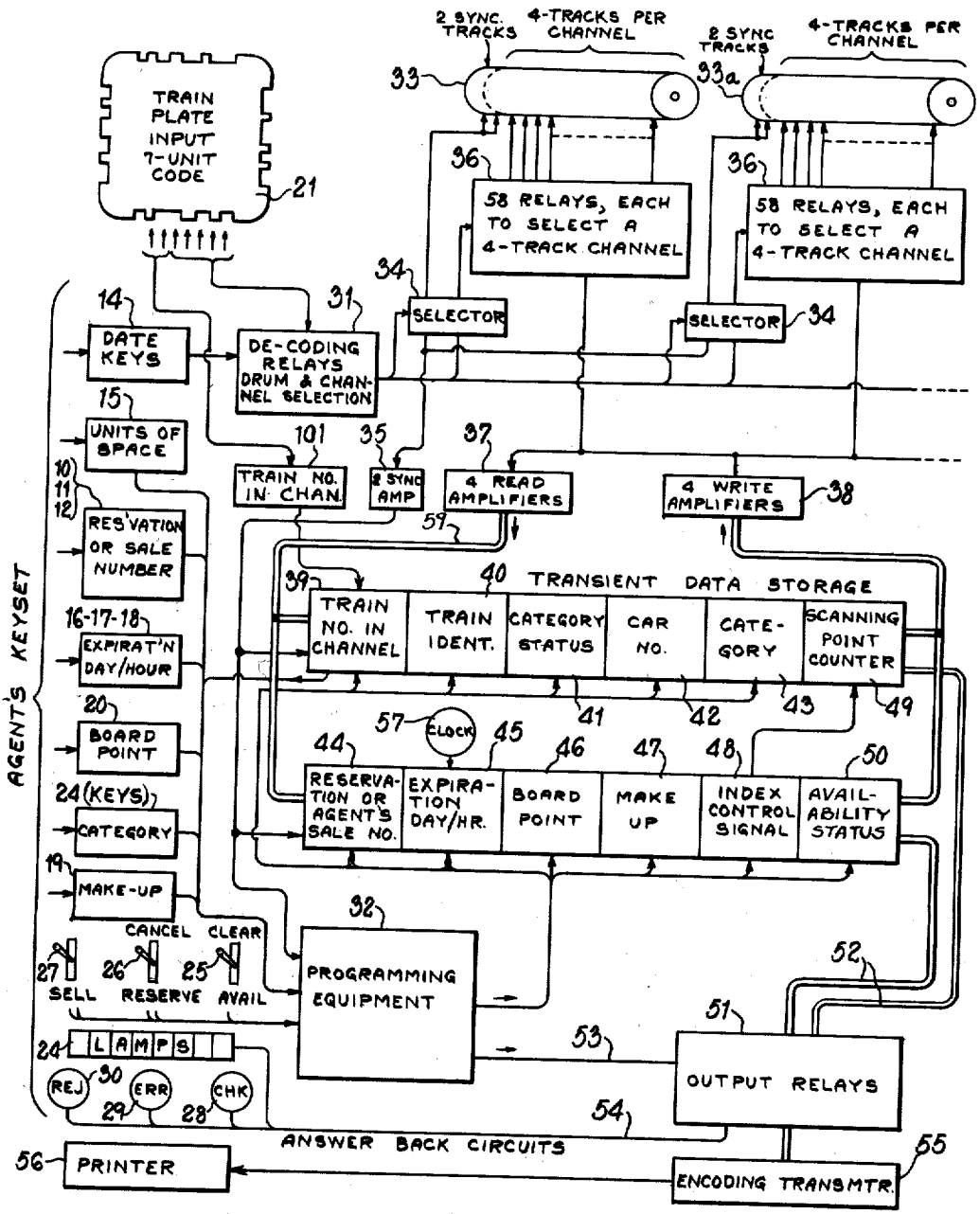
Fig. 2 is a block diagram showing schematically the basic components of our improved reservation system and how they are coordinated.

Referring now to Fig. 2, we show therein a number of signal-initiating devices at the agent's keyset. These include the various keys as shown in the keyset picture, Fig. 1, and described with reference thereto. The notched train-plate 21 is selected by the agent for insertion in the slot. The number of train plates to be held in a reference file is relatively small, since each plate accommodates the schedules of space accommodations for sixteen different trains.

It will be understood that numerous keysets, both local and remote may be used according to traffic requirements of a particular installation. Also, where communication is to be had between remote keysets and the common equipment, then conventional telegraph transceivers or teleprinter equipment may be used to form an interconnecting link between them, for example, as shown and described in the Connolly et al. application. It will be understood that where more than one keyset line is used, a seeker switch and lock-out means, such as shown in the Schmidt Patent 2,587,532, issued February 26, 1952, or other known type of seeker apparatus, is interposed between the common equipment at the central station and all incoming keyset lines for the avoidance of interference between different keyset operations; but out invention does not reside in such seeker apparatus and for the sake of brevity it is omitted from the drawings.

Collectively, the signals transmitted by the date keys 14 and the contacts under control of the train plate 21 are utilized in a relay group 31 for drum and channel selection where the call should take effect. In making this selection six reading heads will be connected to the electronic equipment. Two of the heads are for scanning synchronizing tracks to furnish respectively a starting pulse once per revolution of the drum, and a train of counting or gating pulses. We shall hereinafter refer to the start pulse as the 1/R pulse and the pulses of the train as "Sync" pulses. The latter are shaped to be used as very brief "spikes" for all gating requirements. The other four reading heads as selected are used for readout of recorded information respecting the wanted space units of a particular train and date.

The recording of evenly spaced bits in the sync track for timing the different gating operations and for locating wanted information by pulse count along the tracks involves well-known techniques of proven utility. An embodiment of our invention for a particular installation at present in the design stage, but with already proven capabilities, will have as many as 4096 bits per recording track, and therefore will require the same number of counting pulses in the sync channel. The 1/R pulse is to occur prior to the commencement of each sync pulse train and is to be repeated every revolution of the drum.

The channel selection as determined by the date keys and the train plate causes a certain one of fifty-eight gang relays 36 to close four circuits for connecting the reading heads of the wanted channel on a particular drum to a group of four read amplifiers 37, or alternatively, for connecting the same heads, at times operative as writing heads, to four write amplifiers 38.

Since during the processing of any particular call the scanning of information channels is confined to only four tracks on a selected drum, it is desirable that the sync pulses be derived from a sync track on the same drum. In doing this it becomes unnecessary to provide any maintenance of phase relations between different drums, although they are rotated at substantially the same number of revolutions per minute.

The programming equipment 32 comprises numerous relays, and electronic gates which are caused to function in various sequences in executing an order. The techniques and processing involved are familiar to those skilled in the art and are well exemplified in said Connolley et al. application. Our invention makes use of programming equipment in much the same manner, but with adaptations to our particular needs, as will be explained in due course.

Keys 25, 26 and 27 on the agent's set are used selectively to initiate any one of a number of different types of programming. These and other keys on the master agent's set (not shown) serve also to initiate other types of programming for orders as listed above. In all cases a cyclic scanning of a selected channel during from one to three revolutions of the drum is involved. Wanted portions of the scanning tracks are located by use of a sync pulse counter, and by means of comparators or coincidence circuits, as is conventional practice. The counter is reset to a predetermined count in every drum revolution by means of the 1/R pulse, and is also reset to different starting counts by means of interspersed control signals.

There are numerous input and output circuits which extend to and from the control equipment. Of the input circuits there are those which carry information according to the set-up of keys in the keyset. In Fig. 2 we show blocks 15, 10–11–12, 16–17–18, 20, 24 and 19 which are referenced according to the key groups shown in Fig. 1. Permutation code wires are switched through the seeker switch by a calling station and cause the actuation of suitable relays which are operatively associated with electronic gates under control of the sync pulses. By such means the output circuits from the control equipment are made effective in the selection and control of certain transient data storage units which in Fig. 2 are individually labeled according to their informational content or function.

Figure 5:
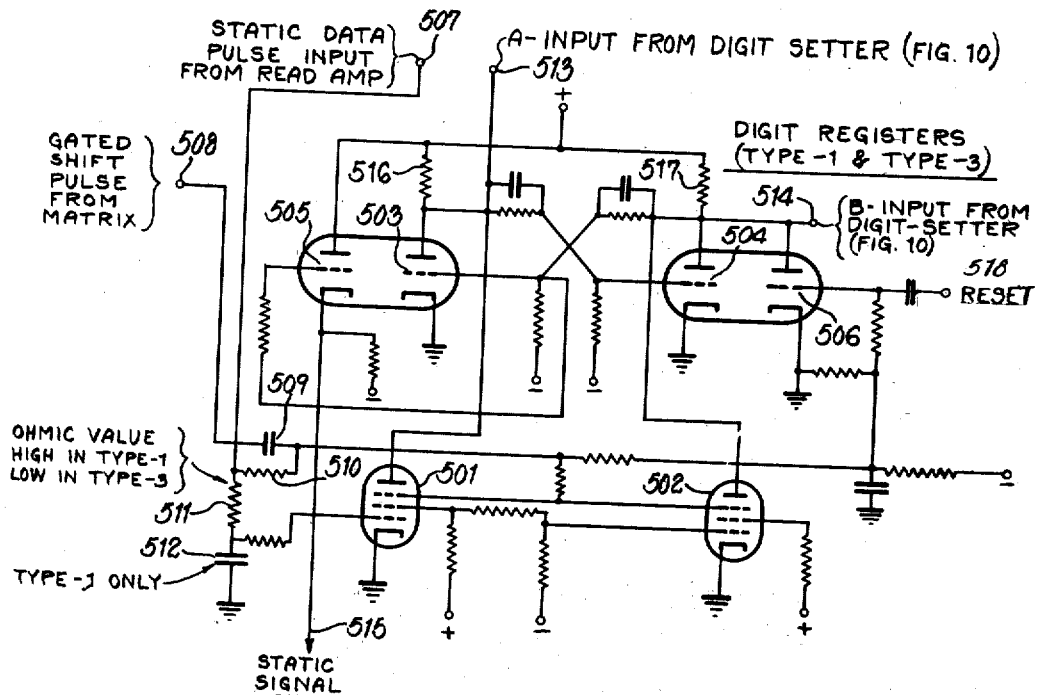
Fig. 5 is a circuit diagram of two alternative types of digit registers employed.

The data storage units are generally of the form known as "digit registers" or "shift registers." Fig. 5 shows a typical circuit diagram of such a register and of a modification thereof. Each of the digit register groups comprises from one to several digital orders wherein successive items are series-fed into the input stage and transferred from stage to stage until all digital orders are filled with the information. Then at one gating pulse time the multiple digit item may be read out and applied to output circuits for various uses according to the nature of the programming called for.

Included in the transient data storage units are those of the labeled blocks 39 to 48 inclusive, as shown in Fig. 2. Cooperating with the index control signal group 48 is a scanning point binary counter 49, which will also be explained further when describing Fig. 3. When an availability call is made, it is frequently necessary to look for a number of available adjacent spaces. The adjacent space counter 50 is used for this purpose, as will be explained later.

In executing any of the calls from an agent's set or from the master agent's set, it is, of course, necessary to report back selected pieces of information, as placed in the temporary storage units 51. We, therefore, provide selectively operable output relays of the group 51, different ones of which are actuated in accordance with any particular call. Instructions are fed to these relays from the programming unit 32 through circuits 53. Timing control and the information itself is signaled to the output relays through circuits in the cable 52, different circuits being individual to different data storage units of the group 39 to 47 inclusive.

The answer-back circuits in cable 54 provide communication between the output relays 51 and certain lamps in the agent's set. These lamps include the row 24, which are eight in number, for showing the categories of space, and lamps 28, 29 and 30, the functions of which have already been explained. The encoding transmitter 55 may be of conventional type, its mode of operation being well known. For uses similar to ours it is described in detail in the aforesaid Schmidt Patent 2,587,532. Its output is delivered through a teleprinter circuit to any one of a number of printers 56, each being conveniently located near one of the keysets and selectively chosen for operation thereat.

*Arrangement of the information on the magnetic recording tracks*

Figure 9:
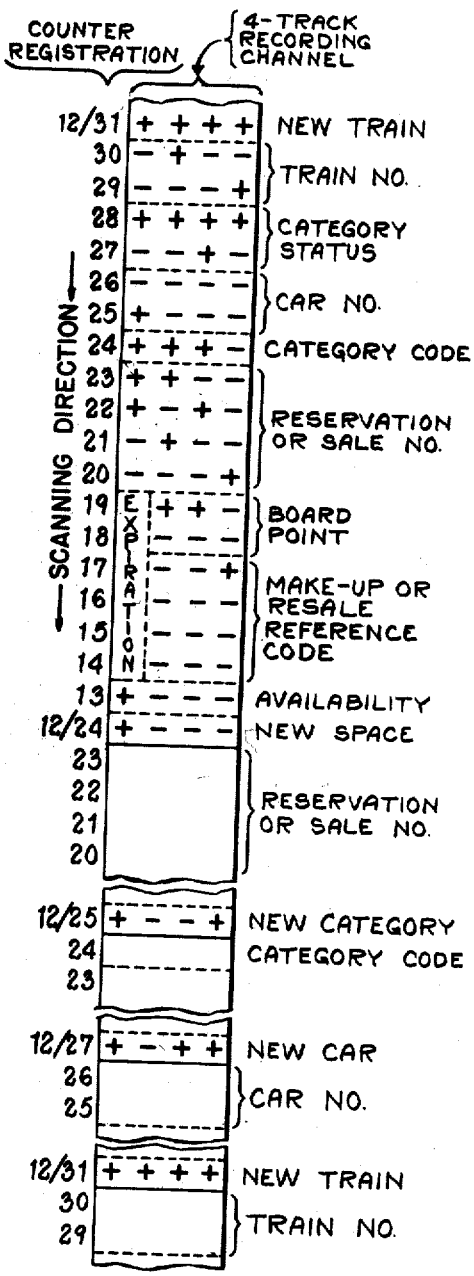
Fig. 9 is a plan view (developed) of a magnetizable surface, such as a drum periphery, on which spot recordings may be written, and read out; the arrangement of "bits" in a four-track channel being suited to the peculiar requirements of a train reservation system.

Fig. 9 will now be explained in order to lead up to the more complex phases of the system. The developed plan view of a portion of the magnetizable drum periphery is enlarged, since the individual bits of recordings to be considered are in reality so closely packed as to be virtually microscopic. The packing factor which we have chosen for our present embodiment is 80 bits per lineal inch of recording track and we have only $\frac{1}{16}$" separation between adjacent tracks.

The master agent's set is used daily to write in new train schedules for the 29th day ahead. These new schedules automatically erase the ones that have just expired. Ordinarily the train schedules can be accommodated so as to write two or three of them serially on a single four-track channel.

Fragments of a typical train diagram, as shown in Fig. 9, should be read downward in a line-for-line manner, each horizontal line or row usually containing a four-unit code signal, and the four code elements being placed respectively in four parallel tracks. The signals may represent binary decimal numbers, each four-unit code being a decimal digit with the lowest denominational order in the right hand track. In portions of the record, however, such as rows 19 to 14, three-element code signals will occupy three tracks and alongside will be found a serial recording of a six-element code signal in one track, this signal denoting an expiration date or hour. Other signals may, however, be arbitrarily arranged code permutations.

Successive scanning points of read-out or write-in by magnetic heads preferably have a significance which is explained by legends to the right of the tracks as shown in Fig. 9. The polarity of spot or bit magnetization is illustratively shown by $+$ and $-$ signs and if these bits represent binary digits, then $+=1$ and $-=0$.

*Train diagrams as initially set up by master agent*

The signals forming the train diagrams for any particular day and any particular recording channel and a particular train are recorded on the drums, and are capable of revision by a master agent's station in any manner known in the art, for example, as disclosed in the aforesaid Connelly et al. application, the aforesaid patent to Schmidt No. 2,587,532 and the patents to Sharpless et al. 2,611,813 and Dusek et al. No. 2,549,071. The composition of a typical train diagram recording, as set up by the master agent, is dictated by the actual plan of space accommodations in any particular train. The record begins with an index control signal, here called "New Train," and signifying a train the diagram of which follows next. The same index control signal $++++$, or binary number $1111=31$ is to introduce each new train diagram as recorded on the same 4-track channel. The digits of the index control signal relate to binary digit orders $2^4$, $2^2$, $2^1$, $2^0$ in the scanning point counter (indicated by reference numeral 49 in Fig. 3), there being no need to vary the setting of the digit order $2^3$ other than as it changes during normal progression of the counter through its permitted range. This is possible by reason of the fact that the four different index control signals required for resetting the counter, as hereinafter described, were chosen as binary numbers 11111, 11011, 11001 and 11000 which are invariable with respect to the binary order $2^3$.

Indentification of any particular train, inserted by the master agent, is given by the train number in two decimal digits at scanning points numbered "30" and "29," Fig. 9. The scanning points are numbered according to successive settings of an electronic down-counting counter 49 (Figs. 2, 3 and 14), starting with count "31" and ending with count "12." Referring to the train diagram of Fig. 9, the first scanning point designated "12/31" represents a code signifying that the diagram of a new train follows. As scanning proceeds from point "12/31" down through "13" the data is separately read out and is transiently stored in selected external electronic registers corresponding to the several items of data. The scanning points "12/31" through "13." represent the first accommodation scanned on that train and hence the data includes train number, category status, car number and category code, as well as all data subject to change with each reservation of the accommodation. The next scanning point "12/24" indicates that the following accommodation represents a new space of the same category and in the same car as the preceding accommodation and hence indicates that no change ensues in the following accommodation in regard to train number, category status, car number or category code, which data have been established by the preceding accommodation group and are retained in the storage registers 40, 41, 42 and 43 of Fig. 3. Therefore, at the point "12/24," down-counting counter 49 is reset to start from count "24." When point "12/25" has been reached, it is found that a new category of accommodations in the same car is to follow and hence the following scanning point "24" contains a code number identifying the new category. At point "12/27" a new car is indicated which must therefore be followed by a car number stored at points "26" and "25" followed by information in regard to the category code (not enumerated, but similar to that at any of the preceding points "24"). Therefore, the counter 49 is reset to start from count "27." When the entire train diagram has been scanned, as at point "12/31" at the bottom of the diagram of the particular train just scanned, it is necessary to indicate that a new train diagram is to be interrogated and hence the new train number, category status, etc., must be established, and therefore the counter 49 is reset to start from count "31" so that the data transiently stored in registers 40 to 43 may appropriately be changed.

The code signals at scanning points 28 and 27, which are recorded and kept up to date by the master agent, indicate whether or not at any time there is available space of different categories in any of the cars of the entire train. Eight different categories are provided for, such as parlor car seats, upper and lower berths, drawing rooms, etc. The bit spaces on the four tracks and at scanning points 28 and 27 are individual to the respective categories and are, therefore, single-unit signals. Whenever all of the spaces of a given category are taken up by reservation or sale the corresponding bit recording in the category status group is to be changed promptly thereafter to indicate that fact. The master agent can take care of this by periodic scannings of space units or available status only throughout the train and then by making a corrected posting for the overall status as found. The record is also adjusted to restore an availability status when a cancellation is entered.

The location of individual space units in different cars is shown by writing the car number as two binary decimal digits at scanning points 26 and 25. Then follows a 4-element code signal (Category Code) at scanning point 24 where the category of like spaces in that car are grouped in the four-track channel.

Scanning points 23 to 13 contain posting signals that originate from the various agents' keysets according to transactions of three types, i.e., reservations, sales and cancellations, respecting an individual space unit, this information including a reservation or sale number, the board point, the expiration date or hour for picking up a passenger's ticket after reserving space, data concerning instructions to the porter, or a reference code signal covering a seat sale to a second customer for travel beyond the first customer's destination, and finally a code signal "Availability" which is used to denote the status of the particular space unit as either unreserved, reserved or sold, and whether or not available for secondary sale. The "availability" code is initially inserted by the master agent, but is automatically changed in accordance with transactions by the various selling agents. Scanning points 23 to 13 inclusive are always used as a group to cover informational items respecting an individual space accommodation.

Each scanning point 12 is always used to represent an index control signal for resetting the counter 49, that is, to give it alternative instructions for making a new start. This counter causes a distribution of read-out pulses to different ones of the temporary storage units as above described. Depending on the details of the train diagram the resetting of the counter 49 must be varied so as to make predetermined new starts at either of counts 24, 25, 27 or 31, and thereby to scan record points where there are designations of "new space," "new category," "new car," or "new train." The index control signals are originally recorded at scanning points 12 by the master agent and perform their functions in the following manner.

*The index control signal (abbreviated—ICS)*

Four different permutations of the index control signal may be used, and may have alternative significance thus:

+ — — — New space (same category)
+ — — + New category
+ — + + New car
+ + + + New train.

The order in which the space unit data for the different trains recorded on the same 4-track channel are arrayed is one that groups the space units of like category in each car, then progresses from car to car and train to train.

Between successive blocks of scanning points at counts 23 ... 13 there is always an ICS of one or another type. If ICS=+ — — — at count "12," then counter 49 will be reset to the starting point "24" so that the next periodic stepping pulse will advance it to count "23" whereat the scanning of another space unit block will be started, this unit being of the same category as the previously scanned unit.

When all space unit blocks of like category in the same car have been scanned, and if there is another category of space units in the same car, these will be reached by use of an ICS of code + — — + (New Category). This signal causes counter 49 to be reset to count "25," which is one step ahead of the scanning point for designating a new category. Recurrence of ICS=+ — — — (New Space) must intervene between new space blocks in this new category.

After all space units in a given car have been scanned, a new car number must be designated, inserted by the master agent. The code for ICS is then + — + +, whereat counter 49 is caused to be set back to position "27"=11011, and the next stepping pulse will advance the counter so that the next scanning point will be numbered "26," and that point will be recognized as the first digit (in binary decimal form) of the car number. Then, after all space units in the last car have been scanned, the ICS must take the form + + + + so as to cause counter 49 to be reset to count "31." At count "30" the first digit of a new train number will be recognized. Successive train diagrams in the same record channel may thus be scanned in their entirety and without need to specify the train number more than once.

The showing in Fig. 9 of fragmentary portions of a typical recording channel on the drum makes it clear that whenever one or another ICS is found at scanning point "12," the counter 49 must be reset accordingly, so as to start a new count one step ahead of any new scanning point. Therefore, in Fig. 9 the ICS designations at the scanning points for this signal are labeled 12/31, 12/24, 12/25 and 12/27 to indicate the resetting jumps of the counter, these jumps being taken intermediate between two regular stepping pulses.

*The transient storage units*

Figure 3:
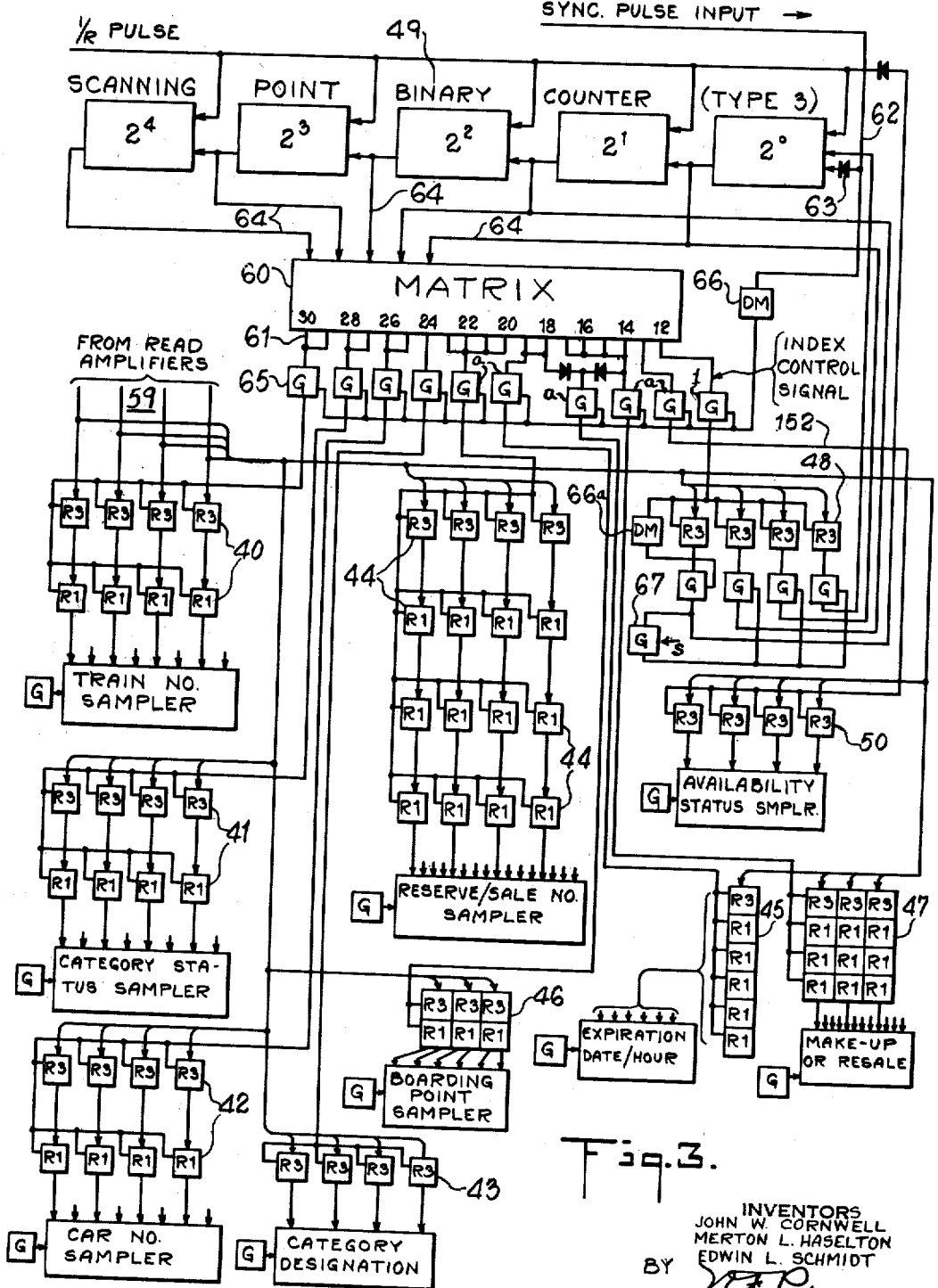
Fig. 3 is another block diagram of components which are to be called into service for the execution of certain types of orders, say, to make an availability check, and to supply necessary information to an agent in response to an inquiry.

Fig. 3 comprises a diagrammatic showing of transient storage units and other components which cooperate therewith for read-out and other utilization purposes. The several data items to be read out from the magnetic drum channels, and as separately indicated by blocks in Fig. 2, are fed to different groups of shift registers R3 and R1. Each group has a reference number which corresponds respectively with that of a block in Fig. 2. From four separate read amplifiers 37 (Fig. 2) there is a continuous outflow of signals representing information, provided that the amplifiers are conditioned by signals representing "instructions" to make a reading. The information comes from scanning heads associated with a selected drum 33 and a selected channel thereon, according to the operation of relays 36. The source of sync pulses is always selected by a proper one of the relays 34 to correspond with the drum selection. This information is distributed selectively to the transient storage units in the following manner.

*The function of counter 49 in cooperation with matrix 60*

It is the function of the scanning-point counter 49 in cooperation with the matrix 60, Fig. 3, to distribute the read-out signals to appropriate transient storage units, Figs. 2 and 3. The need for resetting the counter 49 under control of the index control signal (ICS) at the end of each space unit block will, therefore, be apparent. The output leads 59 from the read amplifiers are branched to different digit registers R3, as indicated in Fig. 3. There are separate lines for each of the four recording tracks in a given channel. A typical circuit arrangement for a single digit register is shown in Fig. 5, which will be described in more detail later.

When two or more digits are required for storage of an item of information, as in the train number group 40, for example, then the digit registers are concatenated and constitute a "shift register." From a read-out of each track the signals are applied directly to a register R3, being selectively accepted by just one such register of the several that have their input terminals constantly coupled to the output of the read amplifier. The readings from the four tracks of a channel are, of course, simultaneous and are applied concurrently to the four top row registers R3. All registers in non-selected branches of the read-out circuits are made unresponsive to the data signals by virtue of the fact that they are enabled to respond only when their input circuits are gated to do so. The gating control comes from the matrix 60 in each case and in the following manner:

Matrix 60 has a number of output leads which severally and individually decode the settings of the counter 49. The reset position "31" of the counter occurs in response to the 1/R signal and in response to an ICS of type $++++$, and is only transitory, being intermediate between two steps of advancement as caused by the periodic stepping pulses. Thus, the first counter setting to be utilized is count "30," to which the matrix responds by delivering a static pulse to its output circuit 61.

Counter 49 is advanced in retrograde steps by sync pulses fed thereto through conductor 62 and through a diode 63, this control being applied to the digit order $2^0$. The higher orders of digits in the counter are actuated in the well known manner, each at half the fresuency of the next lower order digit.

The output circuits from each of the digit order stages of counter 49 lead through conductors 64 to the input side of matrix 60 and their combined effects are translated into single pulse output through successive ones of the matrix output circuits such as conductor 61 leading to gates 65. There are nineteen of these output circuits, each corresponding to one of the descending counts from "30" to "12" through which the counter is enabled to progress.

The train number is stated in two binary decimal digits and hence its shift register 40 has two stages of digit registers R3 and R1, so that the tens digit of the number may first be stored in the four registers R3 and then shifted to registers R1 while the units digit is received therein and caused to replace it.

In order to gate the read-out of train number information into the shift register group 40 two successive static pulses must be delivered to the appropriate gate 65 and a delayed sync pulse must also be delivered to that gate to open it only for an instant, this pulse being a "spike," or differentiated sync pulse. This spike is delayed by a delay multivibrator 66 and is applied commonly to all of ten gates 65. But the matrix outputs cause these gates to open one at a time.

Some of the matrix output circuits are joined together so as to cause certain gates 65 to be opened two, four or six sync pulse times in succession. In this way the shift register group 40, for example, will receive signals from the read-out amplifiers while counter 49 stands at counts "30" and "29." The two successive readings at these counts are both applied to registers R3, the tens digit of the number being followed by the units digit. The tens digit when stored in registers R3 is shifted automatically to registers R1 when the units digit of the train number is delivered. The two-digit binary decimal number now remains stored in the train number group 40 of the shift registers until a new train number replaces it.

From the foregoing description of Fig. 3 it will be apparent that in a read-out operation the scanning of record tracks on the drum can supply necessary information to be transferred to temporary storage in the digit register units R3. The input to the top horizontal row of digit registers in any group will receive all the signals successively through different digital orders, and as the higher order digits are followed by lower order digits they will be transferred down the line in each group so that after the group of registers is filled the numbers can be read upwardly, with highest order digit being stored in the bottom row of registers R1. Thus, in group 44 which stores coded decimals in each of the four parallel tracks of the drum record, the four-figure number representing a reservation or sale number will be stored in this register group 44 with thousands in the bottom row, hundreds in the row next above it, and tens and units in the ascending rows thereabove. This number can be further transferred into relay storage by means of so-called "relay pullers" which are of well-known construction. The combination of an electron tube with the winding of a relay through which anode potential is conducted constitutes such a relay puller. These relays are useful for sampling under the control of gates and are operable in a conventional manner.

Figure 10:
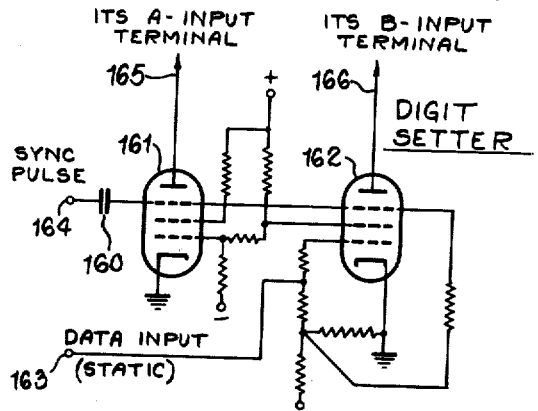
Fig. 10 shows a circuit component called a Digit Setter. It is an electronic device the purpose of which is to introduce signals into a shift register or other transient storage unit when such signals are of keyset origin and must be gated into the storage unit at a precise instant.

When data items are to be written into the drum the above described digit registers R3 and R1 may be loaded by the gating of desired items into their input circuits, the items being previously set up in relay storage when actuated by signals from the keyset. An electronic digit setter of the type shown in Fig. 10 is used. The timing of operation of the digit setter may be conveniently set in anticipation of the use of the registers for write-in purposes. This timing is under control of the programming unit.

The actual timing of output from the digit registers for write-in purposes is under control of the counter 49 in cooperation with matrix 60. These units serve to locate the proper bit space along selected tracks whereon to apply the register-stored information. The process steps may be summarized as follows:

(1) Set the relays for write-in signals from the keyset. (2) Use a digit setter (Fig. 10) to introduce the relay-stored data into registers R3 and R1 under control of the program unit. (3) Start a write-in operation by conditioning the write-in amplifiers to respond to signals. (4) Use counter 49 and matrix 60 to issue gating signals which will cause registers R3 and R1 in each group to deliver their storage to the write-in amplifiers. (5) Read the signals out from the bottom row of each group. In this operation the shift register will function so as to gate out the storage in the bottom row directly through write-in amplifiers, the successive gate signals being, at the same time, operable to shift one row of stored items downward until all rows are delivered as output from the bottom row. Successive gate pulses will thus bring out each plural digit number duly timed for recording in its proper place on the tracks of the drum.

*Circuit components otherwise called building blocks*

Figure 4:
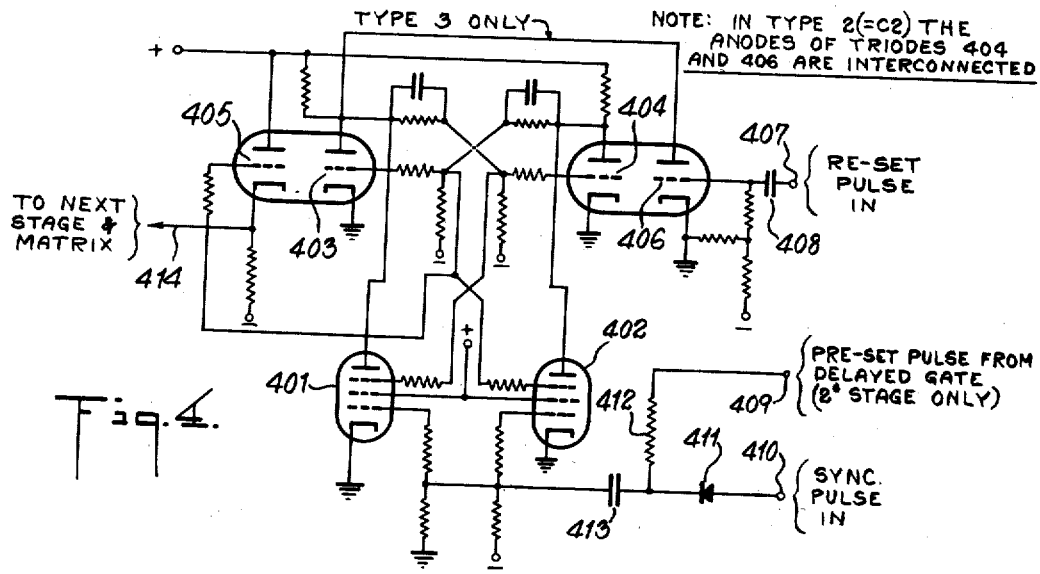
Fig. 4 is a circuit diagram showing one form of electronic counter which we use in the programming process.

The building block components as illustrated in Figs. 4 to 8 and 10 to 13 are, for the most part, well known in the art. Since they are, as shown in this application, very generally used for assembling the complete structure of our invention, it is thought that the most important ones of these units should be described in sufficient detail so that the assembly drawings may be better understood and the operation of the system as a whole may be correctly interpreted. It is therefore in order to describe these building blocks. The identity of these units as otherwise represented in the comprehensive circuit diagrams is facilitated by labeling the same according to their well-known titles, or by abreviating them as follows:

Fig. 4. Digit counts—Type 3 for component 49, otherwise type 2 (C2).

Fig. 5. Digit registers—Type 1—R1, digit registers—Type 3—R3.

Figure 11:
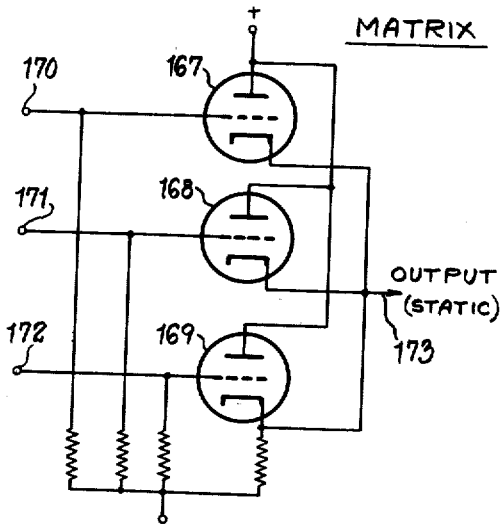
Fig. 11 shows a typical matrix circuit component the output circuit of which yields a static negative pulse when and only when all of the input circuits have negative potentials applied thereto.
Figure 12:
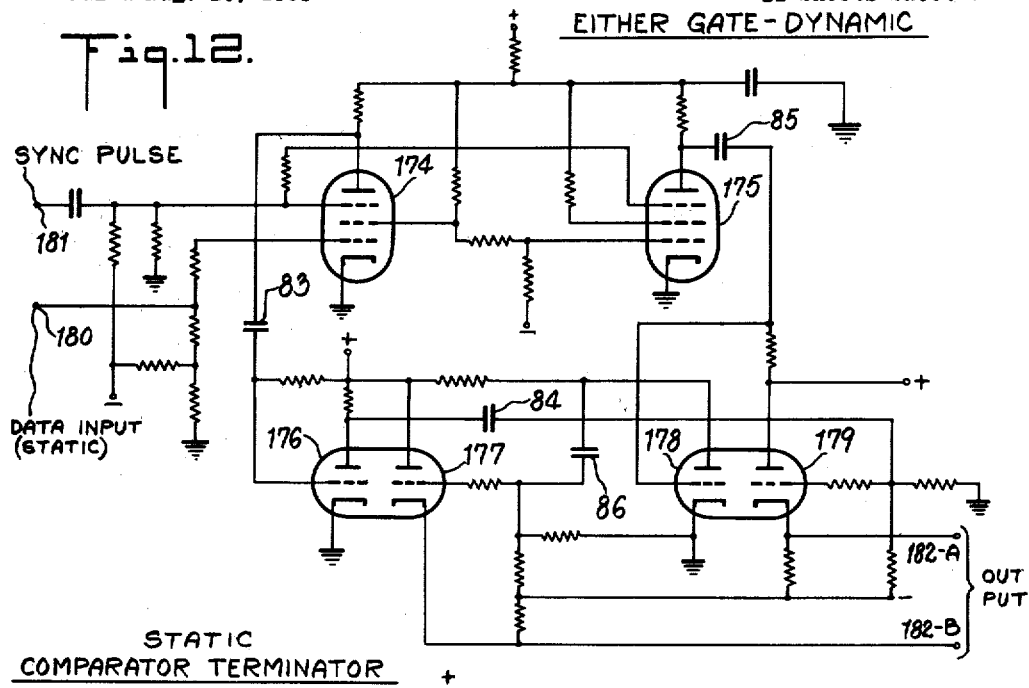
Fig. 12 shows a circuit component which we call an "Either Gate-Dynamic." Output pulses are gated to either one or the other of two alternative output circuits according to whether a static input signal is at one or another potential when a synchronizing pulse is applied.
Figure 13:
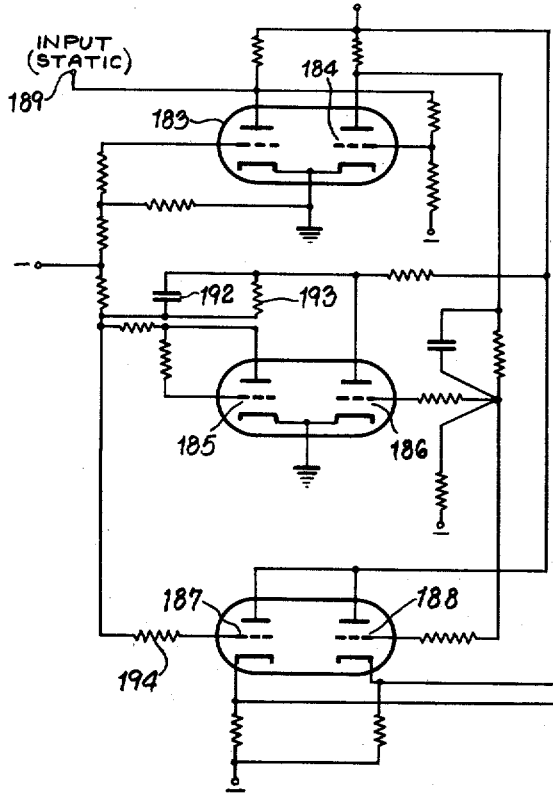
Fig. 13 shows an electronic sub-assembly unit called a static comparator terminator which is used to unify the effects of several comparator units the output terminals of which are joined together.

Fig. 6. Delay multivibrator—DM.
Fig. 7. Static comparator—Cp.
Fig. 8. Dynamic comparator terminator.
Fig. 10. Digit setter—DS.
Fig. 11. Matrix—M.
Fig. 12. Either gate, dynamic—EG.
Fig. 13. Comparator terminator, static—CT.

*Fig. 4—Digit counters*

Type 3 as shown is used in each denominational order of the scanning point binary counter 49. The tube complement comprises two pentodes 401, 402 and four triodes 403 to 406 inclusive, the latter being preferably twin triodes.

The circuit as shown is for one binary digit, and includes a dynamic counting pulse input terminal 410, to which sync or other counting pulses are applied. At terminal 409 a preset pulse may otherwise be applied, as coming from a delayed gate, useful when a predetermined count is to be set into the counter prior to its advancement by sync pulses. A reset pulse may be applied as needed at terminal 407. Output terminal 414 is connected to terminal 410 of the next higher order stage if any, and also to a utilization device such as a matrix, for example.

Triodes 403 and 404 are intercoupled as a flip-flop circuit. A positive dynamic reset pulse applied to terminal 407 and through capacitor 408 to the grid of triode 406 renders this triode conductive, thus lowering the anode potentials in both triodes 406 and 403. This action lowers the grid potential in triode 404, cutting off conduction therein so that its anode potential is high. Reflex action on the grid of triode 403 stabilizes the conductive state therein.

The stable state of the flip-flop 403, 404 as above stated causes the suppressor grids in pentodes 401 and 402 to be at relatively low and high potentials respectively. These pentodes, so conditioned, provide responsiveness to sync pulses or a preset pulse in pentode 402 and immunity to response in pentode 401. Such pulses thus lower the anode potential in pentode 402 and cause triode 403 to be blocked, tube 404 being then flipped to the conductively stable state.

The grids of triodes 403 and 405, also the suppressor grid of pentode 402, rise and fall concurrently. Therefore, in the stable state produced by the reset pulse, as set forth in the preceding paragraphs, cathode follower 405 delivers a low static output voltage. At the same time the suppressor grids in pentodes 402 and 401 are set to low and high potentials respectively, thus conditioning pentode 401 to respond to the next counting pulse and to flop the trigger pair 403, 404 to the same stage as initially produced by the reset pulse. After the first counting pulse the cathode follower 405 is set to deliver a high static potential upon receipt of the second counting pulse as required for advancing the count downwardly in the next higher binary digit counting stage.

Counters C2 (Figs. 14 and 15) are called type 2 counters. They differ from type 3 in that the anodes of triodes 404 and 406 are interconnected, while the anode interconnection between triodes 403 and 406 is removed. This changes the polarity of output at terminal 414 in response to the reset pulse.

*Fig. 5—Digit registers (types 1 and 3)*

The tube complement comprises two pentodes 501, 502 and two twin triodes, the individual triode elements of which are 503–506 inclusive. Input terminal 507 takes static pulse signals and input terminal 508 takes gated shift pulses for actuating the circuit. At times, and independently of the controls just mentioned, input terminals 513 and 514 may be used to accept signals from a digit setter (see Fig. 10) for setting the flip-flop pair 503, 504 to either of its stable stages. Output terminal 515 delivers a static signal of, say, either 0 volts or —27 volts according to the "on" or "off" condition of the cathode follower triode 505.

In other figures of the drawing these digit registers are designated R1 and R3 to distinguish them as of types 1 and 3 respectively. The two types differ only with respect to the delay circuit 511, 512 which is added in type 3 for the purpose of rendering the shift pulse effective only after time has been allowed for transferring an old setting of the register to another register of type 1 in the same storage group. The operation of type 1 (without the delay circuit) is as follows:

Assume that a + reset pulse is first applied to terminal 513. This will leave the flip-flop set so that triode 504 conducts and triode 503 is "off." The low anode potential in triode 504 biases the grids of triodes 503 and 505 below cut-off, so that a negative static output signal is delivered by the cathode follower 505. Now, if a positive static pulse is applied at terminal 507 and through resistor 511 to the first grid of pentode 501 this tube will conduct at least as far as its screen grid, lowering the screen grid potential so that the first grid of pentode 502 (which is coupled thereto) biases this tube to cut-off.

Now, at the instant of input of a dynamic shift pulse at terminal 508 and through capacitor 509 to the suppressor grids of tubes 501 and 502, conduction takes place in one of these tubes as far as the anode; that is, in tube 501, according to the assumed case. If, however, the input signal applied to the first grid of tube 501 had been at cut-off bias, then the screen grid in that tube would be at high potential and would produce conduction in pentode 502 at least as far as the screen grid of the latter.

Direct connection will be noted between the anodes of pentode 501 and triode 503. The same is true of the anodes of pentodes 502 and triode 504. Hence the interconnected anodes will stand at a high potential only if neither of them collect electrons. Considering further the assumed case of applying a positive static pulse at terminal 507 when triode 503 happens to be "off" and triode 504 is "on," triggering of the flip-flop will take place. Thus the lowered potential of anodes in tubes 501 and 503 will bias the grid in triode 504 to cut-off and the higher anode potential therein will cause triode 503 to be conductive. If the same data input signal had been applied when triode 503 was already conducting, then no triggering action would occur, and the previously existing stable state of the flip-flop circuit would persist.

The function of triode 506 may be ignored so far as the present disclosure is concerned. This triode would serve as an amplifier for reset signals if applied to its control grid. Our digit registers are, however, preferably set one way or the other by means of the digit setter of the type shown in Fig. 10, as already explained.

*Fig. 6.—Delay multivibrator*

The tube complement consists of a pentode 601 and two twin triodes 602 and 603, these triodes preferably having a common envelope. This multivibrator is of a one-shot type, that is to say, it has one stable condition which can be upset for a predetermined time interval by a dynamic pulse. After the measured time lapse the stable condition is automatically restored. The operation is as follows:

A positive dynamic pulse is applied at input terminal 604 and through capacitor 605 to the suppressor grid of pentode 601. In the stable state conduction reaches the screen grid but the suppressor grid has a sufficiently negative bias to cut off conduction to the anode. The low screen grid potential biases triode 602 to cut-off. The input pulse causes momentary plate current flow in the pentode 601 and produces these effects: (1) the lowered anode potential delivers a negative surge through capacitor 611 to the first grid of pentode 601, thus tending to cut off conduction therein and raise the screen grid potential to a suitable level for triggering the trioxide 602 into conduction. The anodes of devices 601 and 602 are interconnected so that conduction in either one will produce or maintain the cut-off bias on the first grid of pentode 601.

The measured time interval for this upset condition is, however, terminated by the action of the circuit parameters, including those which intercouple the screen grid of the pentode 601 and the grid of triode 602; also the rectifier element 610, capacitors 606, 609 and biasing means 607, 608, 620 which are operatively associated with the grid of the cathode follower triode 603. A regenerative action thus takes place following the first application of a positive pulse to the grid of triode 602, for the reason that as the triode starts to conduct it builds up more blocking bias on the first grid of pentode 601 and raises its screen grid potential so as to maintain conductance in triode 602. Regeneration is gradually reduced however by the discharge of capacitor 611, the charge leaking off through resistor 613. Then the pentode 601 again starts to conduct and when its screen potential drops to the point of cutting off the conductance of triode 602 the stable state of the circuit is restored.

The final stage of recovery of the circuit is characterized by an acute rise of anode potential in discharge devices 601 and 602. This action produces a positive pulse through capacitor 606, causing conduction in triode 603. Since this control pulse is positive it is not clamped by the rectifier 610. Hence the cathode follower device 603 is enabled to deliver a suitably vigorous dynamic output signal at terminal 619.

Fig. 7 comparator—Type 1

The function of the comparator is to deliver an output signal, the polarity of which represents either agreement or disagreement between 2 input signals. Fig. 7 shows 2 identical and independent comparator units which, for convenience, are mounted on a single chassis. The tube complement includes pentodes 701 and 704 inclusive. Each pair of these tubes is in a separate section. The left hand section has input terminals 705 and 706, and an output terminal 707. The right hand section has input terminals 708 and 709, and an output terminal 710. It will be sufficient to describe the operation of the left hand section. The circuit is so arranged that current will be drawn through tube 701 only if the voltages on terminals 705 and 706 differ. If the voltages on these terminals are the same the tube will be blocked. This results in the output terminal 707 having a high potential if terminals 705 and 706 have the same input potentials. The output from terminal 707 will be at low potential if the inputs differ—hence this unit compares the two inputs. For example, assume that terminal 705 is at ground potential so as to cause conduction in tube 702 as far as the screen grid therein. The screen potential will therefore drop and will lower the suppressor grid potential in tube 701 through the divider of the circuit which interconnects them.

Now, if at the same time the potential of terminal 706 is equal to that of terminal 705, that is to say at ground potential, then tube 701 will be conducting as far as its screen grid of tube 702. The supposition in this case being that if the two input potentials were the same as ground potential, both tubes 701 and 702 will be blocked by their respective suppressor grids. The anode potentials in these two tubes being interconnected and connected to the output terminal 707, the output signal will obviously be at high potential. The potential source applied to these anodes is not shown in Fig. 7 but it will be understood that the utilization device to which terminal 707 is connected will have therein a source of positive anode potential to be connected to terminal 707.

Now on the assumption that input terminal 705 is at a negative potential and 706 at ground potential, tube 701 will be conducting to its screen grid and will, through the voltage divider, cause the suppressor grid of tube 702 to be negative and to block tube 702 between the suppressor grid and the anode. Tube 702 however will also be blocked by the negative input signal applied to tube 705 and will cause a high screen grid potential to be developed in tube 702. The result of this action is to drive the suppressor grid in tube 701 positive and to cause conductance through the entire space path of the pentode 701. This is one of two cases where the input signals differ in potential. The other case would be where input signal applied to terminal 705 is at ground potential and the input signal at terminal 706 is at a negative potential. The conditions in this case would be just the reverse of those previously described for input signals that differ. In both cases, however, one of the pentodes would be conducting while the other is not. Despite the blocking of one of the tubes, both anodes will be at relatively low potential because of the conductance of the one tube. Therefore, the output signal would be at a relatively low potential and will signify the lack of agreement between the two input signals.

Fig. 8—Comparator terminal—Dynamic

The tube components comprise pentodes 801 and 802 and four triodes of which 803 and 804 are in one envelope, while 805 and 806 are in another envelope as twin triodes. This comparator terminator is of a dynamic type as distinguished from a static terminator as shown in Fig. 13. Either of these comparator terminators may be used in operative association with a group of comparator units such as shown in Fig. 7. In Fig. 8 two identical and independent comparator terminators are shown because, for convenience, they are mounted on a single chassis and constitute one building block. Only the left hand section need therefore be described.

The function of this comparator terminator is to develop a negative-going dynamic outgoing signal at the instant of application of a positive gating pulse to terminal 808 but only when terminal 807 has first been set to a positive value by turning off conductance in all of the comparator pentodes of a group the anodes of which are interconnected. The operation is as follows: Assuming that the comparison between the conditions set up in the preceding comparators show agreement, that is that all of the pentodes of different comparators have been turned off. A relatively high output voltage appearing on terminal 807 will cause the pentode 801 to conduct as far as its suppressor grid. This prepares the tube, therefore, to be conductive all the way to the anode upon reception of a gating pulse at terminal 808. Triode 803 is normally conductive, and since it is operative as a cathode follower its cathode potential applied to output terminal 809 is relatively high. The gating of pentode tube 801 causes the triode 803 to be blocked so that the cathode potential therein is suddenly lowered substantially to the minus voltage of the biasing source. At the end of the gating pulse the screen grid potential in pentode 801 will again be reduced to a blocking bias due to the voltage divider parameters of this tube, the latter being connected both to ground and negative source. When the anode potential in pentode 801 again rises it will not produce an adverse effect of developing a high voltage spike on the grid of triode 803 because this spike will be drained off through the space path of triode 805. So, the triode 803 merely recovers its normally conductive state and the outgoing signal is devoid of an unwanted positive surge impulse.

Fig. 10—Digit setter

This circuit comprising two pentodes 161 and 162 is usable to generate a dynamic output pulse and to apply the same to the input terminals of a digit register such as shown in Fig. 5. The object of the digit setter is, therefore, to provide a setting of the digit register into either of its two stable states according to the voltage of an input signal which may be applied to terminal 163 under control of a keyset-operated relay.

The circuit is first prepared for performing its function by this static data input signal. Tubes 161 and 162 have a seesaw action at least with respect to their cathode to screen-grid space path. If the static data input signal is substantially at ground potential, then the pentode 162 will be conductive to its screen grid and the low screen grid potential will cause control of the grid in tube 161 to be negatively biased so as to block conductance therein. But if the input signal is at a negative bias potential then conductance to the screen grid of pentode 162 will be cut off and the consequent high screen grid potential will cause conductance in pentode 161 at least as far as the screen grid of the latter. The circuits of Fig. 5 and Fig. 10 are to be viewed as though they were interconnected thus: the anode of pentode 161 (Fig. 10) and the anode of triode 503 (Fig. 5) are interconnected. Also the anode of pentode 162 (Fig. 10) and the anodes in triodes 504 and 506 (Fig. 5) are interconnected. All these anodes derive their positive potentials through one or the other of two resistors 516, 517.

A sync pulse applied at terminal 164 (Fig. 10) and through capacitor 167 times the delivery of an output pulse "A" or "B" for application in the one case to terminal 513 (Fig. 5) or in the other case to terminal 514 (Fig. 5). If pentode 162 has been turned on by a ground potential at terminal 163, then the sync pulse will have no effect on the blocked tube 161 but the positive bias on the suppressor grid of tube 162 will cause conductance to the anode of that tube and thus produce a negative output pulse "B," the effect of which in the digit register (Fig. 5) is to turn off triode 503. This effect is aided by the condition of non-conductance both in the pentode 162 and the triode 503 which develops a minimum potential drop in resistor 516. So, triode 504 is turned on and the stable state of the flip-flop 503—504 is established. The other stable state is likewise established in the flip-flop 503—504 of the digit register when the static input signal applied to terminal 163 (Fig. 10) is minus, thereby causing pentode 162 to be blocked.

Fig. 11—Matrix

This circuit is designed to develop a negative static output voltage when and only when all of its input voltages are negative. The tube complement consists of triodes 167, 168 and 169. Each triode has a separate input circuit connecting its input terminals 170, 171 and 172 to their respective grids in these triodes. If all the input terminals are negative, then, of course, all the triodes will be cut off. So their cathodes will assume a negative bias, as is wanted for output signals at terminal 173. If any one or more of the triodes conducts, then, because of the interconnected cathodes, a positive output signal would be delivered.

It is equally possible to deliver a positive output voltage from the interconnected anodes of this matrix when all of the triodes are held biased to cut-off. But when one or more of the tubes conducts the output from the anode-connected terminal will be at a low voltage.

Fig. 12—Either gate—Dynamic

The function of this circuit is to transfer a gate pulse into one or the other of two output circuits, depending upon the voltage of the static input signal. The tube complement comprises two pentodes 174, 175 and four triodes 176 to 179 inclusive, the latter being preferably enclosed in two envelopes as twin triodes. The static data input signal is applied to terminal 180, and its voltage, at ground potential for one condition and at a blocking negative bias potential for the other condition, determines the course of the dynamic output pulse, which will be positive in either case, but will be delivered alternatively by the cathode follower triode 179 to output terminal 182-A if the input signal at terminal 180 is at ground potential, or by cathode follower triode 177 to output terminal 182-B if the input signal at terminal 180 is negative.

Normally the pentodes are in a standby state with high anode potentials because their suppressor grids are negatively biased. Triodes 176 and 178 are normally conductive. They serve as inverters. The cathode followers 177 and 179 are normally non-conductive.

The operation of this either-gate is explained thus: Its function is performed by first sending into the static input terminal 180 the signal of given voltage, ground or else negative; then by applying to terminal 181 a dynamic sync or gate pulse of positive voltage. Assume that the data signal is at ground potential. Then pentode 174 will conduct as far as its screen grid. Its screen grid will drop to a low potential and bias the control grid of pentode 175 to cut-off, due to the voltage divider connections between these pentodes as shown. Pentode 175, therefore, will not respond to the dynamic pulse, but pentode 174 will. This action causes triode 176 to become non-conductive, so that its high anode potential will, through coupling capacitor 84, turn on the cathode follower triode 179 and cause the latter to deliver a positive output pulse via output terminal 182-A. Incidentally, the control pulse which cuts off triode 176 is delivered through coupling capacitor 83.

Assume now that the signal which is delivered to input terminal 180 is at a negative bias potential. Pentode 174 will be fully blocked. Its screen grid will assume a positive value such as to turn on the pentode 175 as far the suppressor grid of the latter. This will render tube 175 responsive to the gate pulse, while pentode 174 will fail to respond. Now upon reception of the gate pulse the anode of the conductive tube 175 will be at relatively low potential and will, by coupled connection through capacitor 85 to the grid of triode 178 cause the latter to be non-conductive for an instant. Then triode 178, acting as an inverter, and with its anode coupled through capacitor 86, will cause the cathode follower triode 177 to be conductive. The high cathode potential in this triode will then be such as to deliver a positive dynamic pulse as output at terminal 182-B. At the end of the gating pulse the several tubes will be restored to the normal states as set forth above, and neither output terminal will be other than at an inactive negative voltage.

Fig. 13—Static comparator terminator

This circuit is used in place of the dynamic comparator terminator (Fig. 8) when agreement or disagreement is to be noted in the output circuit with respect to a plurality of interconnected comparators such as shown in Fig. 7. The fundamental difference between the functions of comparator terminators of Figs. 8 and 13 resides in the fact that the dynamic terminator acquires a gating signal to be applied thereto for timing the delivery of its output, whereas the static comparator terminator of Fig. 13 is used to deliver a static output in accordance with the combined states of operation of the previous stages of comparators. In other words, the circuit of Fig. 13 is one which will recognize the condition of agreement of all those comparators whose anodes are interconnected, and also connected to the input terminal 189 in the circuit of Fig. 13. This terminal will either repose at approximately 50 volts or 110 volts, depending upon whether, in one case any one or more of the comparator tubes is conductive, or in the other case whether all of them are blocked. If they are all blocked, as in agreement, then the high anode voltage at terminal 189 prevails.

Assume first that the comparators are not in agreement, or that the input terminal 189 is at approximately 50 volts. The voltage divider circuit to which the grid in triode 184 is connected will cause this triode to be blocked. The anode potential therein will then be high and will cause the two triodes 186 and 188 to be conductive. Triode 188 is a cathode follower, the cathode of which will then be high. Neglecting the action of triode 188 for the moment, consider the effect of a conductive state in triode 186. The anode therein is coupled through capacitor 192 and resistors 193 and 194 to the control grid of triode 187 thus blocking this triode. Triode 185 will also be blocked in the same manner.

Under the conditions just now stated it will be seen that the two cathode follower triodes 187 and 188 will be opposingly set. A static negative signal is delivered by triode 187 to output terminal 191, showing a difference when the input signal is negative, and at the same time the positive bias on the cathode of triode 188 is applied to output terminal 190. Assuming that the positive signals are not useful, the difference between the conductive states of the several comparators will be indicated as a negative signal on terminal 191. Upon agreement of all of the comparators, the reverse condition of the cathode follower triodes will be apparent. That is to say, triode 188 will be blocked and will cause a negative signal to be delivered at output terminal 190. The triodes 185 and 186 serve primarily as limiter tubes so as to avoid unwanted surge impulses and to prevent the cathode follower tubes from delivering such surge impulses to the output terminals 190 and 191.

Execution of various orders

Figs. 14 and 15 will now be referred to for explaining how different orders may be executed. The two figures will need to be read as though the right hand edge of Fig. 14 were joined to the left hand edge of Fig. 15.

Availability search

When the agent has seized the common equipment for making an availability search he has first to set the proper date keys 14 (Fig. 1) and a key 15 to designate how many units of space are wanted. He will also insert his agents' key in receptacle 10 in order to unlock the keyset. A chosen train plate 21 will then be inserted. These operations are preliminary to the execution of all orders. If the customer insists upon having a reservation of a particular category choice, one of the keys 24 would be depressed.

Assuming that the common equipment is not then in use by another agent, the connections between the keyset and the common equipment will be automatically completed immediately. If, however, the agent has to wait for this connection, it will be automatically completed by the seeker switch (not shown) as soon as the common equipment has been released, that is, at the completion of the previous call.

The selection of a particular channel on a particular drum for making an availability status search with respect to a particular train and on a particular date has already been explained. Assuming that this selection process has been carried out by the joint use of train plate 21 and the date keys 14, the read amplifiers 37 will be suitably connected through relays 36 to the proper reading heads for scanning the inventory channels appropriate to this inquiry. It is necessary, therefore, to localize the scanning along four tracks and in a section of those tracks which pertains to the selected train. The code signals transmitted by notches and teeth on the train plate will enable the train number and the channel to be identified. Among the control sources that are included in the common equipment are groups of relays 101, 102, 24a and 104 to 108 inclusive, all of which are under control of the train plate and the agent's keyset.

As soon as the common equipment has been seized for the execution of a call, such as this availability search, a scanning operation is initiated in the following manner: As part of the programming equipment 32 a so-called "set-reset flip-flop" circuit 281 (Fig. 16) responds to closure of a grounding circuit by any one of four relays which are actuated from the keyset and which are individual to four types of call, (1) availability, (2) reserve, (3) sell and (4) cancel. The flip-flop, 281 has two input circuits, one to trigger it into an "on" condition and the other to turn it "off." The start signal turns it on, and the stop signal turns it off. In the On setting a static positive potential is used to open a gate 267 through which dynamic 1/R pulses may be passed to a revolution counter 110, 110a (Fig. 14). The gate 267 upon being opened passes 1/R pulses to a counter 110, 110a, the function of which is to operate a group of matrices 113, 114, 115 and for the purpose of distinguishing between successive revolutions of the drum and thus to control different steps of the processing of some of the calls. An availability search, however, is confined to only one revolution.

The information to be manifested by scanning four selected tracks during a full revolution of the drum must be restricted to one of possibly several successive groups of recordings respecting different train diagrams, then to a particular category of accommodations if the customer's inquiry is focused on one category alone. It is possible, however, to search for available space units without restriction to a particular category. Then after one revolution of the drum the answer-back device 54 will have stored in it, by relay storage, the wanted information as to whatever remains at the moment of available space accommodations of each category in the selected train. The answer-back device is capable of delivering its information over direct lines to the keysets, or it may be encoded in the unit 55 and transmitted to a printer alongside the agent's set.

The train plate in the agent's keyset codifies a binary number of one decimal digit to represent "Train # in Chan." This number is not to be confused with the 2-digit train number that might be found in a printed time table, although the latter is also codified and recorded by the master agent on the drum at the head of each train diagram and immediately following an index control signal for "New Train." The "Train # in Chan" signal is set up by relays of the group 101 when the call is sent and only for the purpose of restricting the execution of the call to a portion of the magnetic record tracks in which a desired train diagram is to be explored.

The "Train # in Chan" relays 101 communicate their number representation to two comparators Cp labeled "Train # in Chan." These comparators are then conditioned for delivery of an output pulse upon the occurrence of coincidence with the setting of a two-digit counter 39, where the latter is arranged to count index control signals of the type denoting New Train, as scanned during one revolution of the drum. The coincidence gives the signal for carrying out the availability search car by car and category by category within each car. Before the search starts, the counter is reset to zero by the first received 1/R pulse following the start signal.

The "type of call" signal as stored by relays 108 controls the programming equipment 32 so as to open gate 267 for admittance of the 1/R signal to the revolution counter; also to execute other programming functions. Among the latter, it is necessary to operate relay 132 if a category choice has been expressed; and certain ones if not all of the gates 65 will be made receptive to sync pulses from the sync pulse amplifier 35b; and the read amplifiers 37 will be turned on for the read-out scanning operation.

The scanning point binary counter 49 is reset to 11111=31 by the first 1/R pulse from amplifier 35a and next is set to 11110=30 by the first following sync pulse from amplifier 35b.

The scanning point counter 49 responds directly to sync pulses as passed through the diode 63 and is advanced negatively, as heretofore explained, its binary numbers being translated by the matrix 60. Sync pulses are also delivered through a delay multivibrator 66 to certain gates 65 for distributing the necessary dynamic gating pulses to different digit registers so that the latter may respond to readout signals. This procedure has already been described at some length and with reference to Fig. 3. It will be recalled that the gates 65 operate successively as selected by matrix 60, and as timed by the dynamic sync pulses, for the purpose of directing the output from the read amplifiers 37 into proper digit registers. Even though these registers may receive transistory registrations that are replaced by others as the scanning operation progresses, most of them will have no significance for the availability inquiry we are now discussing, and may be disregarded. What is essential to the finding of available space units is merely the readout of availability status signals at scanning points #13 and the readout of ICS codes at scanning points #12. The utilization of these signals will now be fully explained, at least as far as they pertain to an availability search.

We have mentioned four different permutations of the ICS, as being useful for resetting the scanning point counter 49 to different starting counts. Another counter 39 (Fig. 14) responds only to an ICS of type 1(1)1 1 which represents the starting points of recordings for new train diagrams. One binary digit $2^2$ of this ICS (as here bracketed in parentheses) distinguishes the "new train" signal from the other three. Therefore the digit $2^2$ in the ICS, if it be a + pulse, may be used upon passing it through a gate 122 to advance a counter 39 for counting the starting points of new train diagram recordings in any selected channel.

At the instant when agreement is obtained between the Train # in Chan comparator units Cp and the count of new trains as denoted by their ICS signals a static potential starts to control a comparator terminator 109. The output potential from CT109 persists throughout the scanning of a complete train diagram. Then it ceases because of further advancement of counter 39 when the next ICS of new train significance is scanned.

The output from CT109 is, therefore, useful to restrict the availability search to the selected train diagram. That statement of usefulness is somewhat generalized. More in particular, the static output signal from CT109 serves to exercise a time interval limitation within which certain functions of the programming equipment are to be performed, as will presently be explained. The same signal also contributes an enabling pulse to two matrices 125 and 131. Matrix 125 is useful in the execution of calls other than for an availability search, but not for the latter. It will be explained later. Matrix 131 provides the means for passing availability check signals from a comparator terminator 130 to a gate 133 within the period of scanning the selected train diagram. The derivation of the availability check signals will now be explained.

*Counting the adjacent available space units to the number wanted*

One type of availability search covers all categories of space units concurrently. The other type is restricted to the particular category which the customer prefers. The single category search will be explained first because it is somewhat simpler.

The adjacent space counter 119 registers an advancement of count at scanning point #13 in each data recording group for individual space units, provided that the read-out of the availability signal at that point is affirmative. The counter 119 is, however, reset if the read-out of that signal is negative. We have previously explained how the availability signals when read out are registered in the availability status registers 50. Immediately following each registration, that is, under gate control by the next sync pulse and only at this instant, the ICS signal is read out and stored in the digit register group 48, the timing of its appropriate gate opening being at count #12.

In Fig. 14 we show counter 119 to comprise three denominational orders of binary digits. It is a conventional counter wherein, as diagrammatically represented, input pulses when applied to the lowest order digit register (through the conductor entering the top side of the upper block C2) advance the registration of count, whereas, reset pulses are applied simultaneously to each digit order of the counter; the reset circuit being shown to enter each order on the left side of the diagram.

An "either gate" 150 operates to sample the availability status signal registrations as they appear in the register group 50. Gate 150 opens on the occurrence of each ICS, and directs the sampled availability status signal into the counter advancement circuit if that signal is affirmative, otherwise the output from the EG unit 150 recognizes the negative availability status and causes a reset pulse to be delivered to the several stages of the counter 119 to restore the same to a zero setting.

The wanted number of adjacent space units is set up in comparator units 153 under control of the relays in group 102.

We find it to be convenient, though not essential, to codify the availability status signals pertaining to each space unit as follows, referring to them as binary numbers having four digits $2^3$, $2^2$, $2^1$, $2^0$.

|  | Available | Reserved | Sold |
|---|---|---|---|
| Through Trip | 1 0 0 0 | 0 1 1 1 | 0 0 1 1 |
| First leg only | 1 0 0 1 | 0 1 1 0 | 0 0 1 0 |
| Second leg only | 1 0 1 0 | 0 1 0 1 | 0 0 0 1 |

We prefer to use the coding of availability status signals as shown above because in doing so we are enabled to carry out most of the availability inquiry calls by reference to the highest order digit $2^3$ alone. It is only in parlor, or chair, cars that accommodations are sold for separate legs, that is, to a second traveler who is to board the train at or beyond the destination of the first traveler. And very few patrons call for Pullman accommodations for just one leg of the through trip. If the first reservation or sale is for occupancy for portions of both legs, a second reservation or sale of the same space unit would be barred.

The readout of availability status signals pertaining to each space unit is recognized as such by one of the gates 65 which opens on reaching scanning point #13. These signals are, therefore, registered in the availability status registers 50 and can be sampled at the occurrence of the next sync pulse corresponding to scanning point #12 for the ICS. The sampling process constitutes control of an "either gate" 150 which is enabled by a dynamic pulse at count #12 to pass an affirmative availability signal "1" to the counting terminal at the top side of a digit counter C2 of the group 119. If the signal "0" is sampled as an indication of nonavailability, then the either gate 150 transmits the same as a reset pulse whereby all denominational orders of the counter 119 are reset to zero. In this way it is possible to explore the current condition of the train diagram for the purpose of locating any wanted number of adjacent available space units.

There are other conditions in which the adjacent space unit counter 119 must be reset. These conditions occur whenever a new category, or a new car, or a new train is indicated by the ICS. All of these ICS signals have a positive digit in the $2^0$ order. These reset signals are conducted through a unilateral conductor 127 to the reset terminals of the counters 119. Counter 119 is also reset by the 1/R pulse.

At the outset of making an availability search the number of space units wanted has to be set up in the relay unit 102 and from that unit a control is applied to the comparators 153. Assume, for example, that two adjacent space units are wanted and that these two have been found in the scanning operation, and indicated by successive advancements of the counter 119. A comparison agreement would, therefore, be obtained and the comparator terminator 130 would detect this agreement. This assumes, however, that relay 145, used for another form of programming, has not been actuated. The available space count as just now explained may be utilized upon carrying the output signal from unit 130 through matrix 131 to a gate 133, but only during the scanning of space units in the designated train. This condition is supplied by Train # in Chan count and the conditioning pulse that comes through conductor 151 to matrix 131.

We started to describe the availability search as though it would be conducted only with reference to a particular category designation. The limitation of the search to this chosen category is made possible by the category selection as set up in unit 24a. For this purpose the category choice must be compared with the readout of category code signals at scanning point #24 in each space unit block. Assuming that there may be as many as eight varieties of space unit categories, it is unnecessary to set forth any particular codification of these signals. However, when they are read out and stored in the register unit 43, a matrix decoder 170 of conventional type may be used to individualize the different categories. This decoder has, therefore, eight output circuits, any one of which may be selected according to the category choice. If one of the relays in unit 121 has been operated in response to the selection of a circuit from the matrix 170, and if an availability signal is passed by the matrix 131 through the gate 133 and to the static signal terminal of the puller circuit unit 121 in anticipation of the application of a gating signal through conductor 154 (at the time of the #12 count), then it is possible to deliver an affirmative answer-back signal to conductor 155 and thence to the answer-back circuit unit 54. The output from this latter unit may be utilized in an encoding transmitter 55, assuming that a teleprinter circuit is to be used, or the signals may be transmitted via direct lines to the working keyset, all as diagrammatically shown in Fig. 15.

The comparator terminator unit 130 is operable under either one of two selected conditions according to whether or not relay 132 has been energized in response to instructions from the programming unit 32. This relay will be operated only if the availability inquiry search is to be confined to one category of space units. The selected category in this case would be indicated by obtaining a comparison in comparator unit 141 between the code signals for different categories as registered in the category choice unit 24a, and the readout and registration of category code signals in unit 43. The comparison of like digits in these code signals must show complete agreement in the comparator units 141 before an input signal can be supplied through a conductor 268 to contacts on relay 132 and thence to the comparator terminator 130. So for limited availability searches in one category space units only, the comparator terminator 130 would be enabled to deliver its output signal to the matrix 131 but only with respect to the chosen category.

If an availability search is to be made without limit to a particular category, then relay 132 will not be operated and all category signals as set up in register 43 will be decoded in the matrix 170 so that all of the counts of wanted adjacent space units will be delivered through the comparator terminator 130 and matrix 131 to the gate 133 and thence to the unit 121. In this case the output signals transmitted through conductor 155 will be complete with regard to all available space units of the desired number, thus giving this information without limitation to any particular category.

If more than one group of adjacent spaces of the desired number is located in the scanning operation, then what is found by the continuance of the scanning operation does not disturb the first case of finding the wanted number of adjacent space units. The repetition of answer-back signals will always be of a confirmative nature and do not cancel out what was first found, since the transmission of these signals through comparator terminators, matrices, gates and relay pullers renders the answer-back circuits 54 operable in case of affirmation, but no signals come through these circuits in case of a denial.

In case no available space units to the number wanted are found after scanning the entire train diagram, the failure to register any affirmative signals in the answer-back signal device 54 can be sensed by a test signal from the programming equipment 42, as will be further explained with reference to Fig. 16. Thus, in place of an affirmative answer-back signal it is possible to transmit a signal to light the REJ lamp on the agent's keyset.

*Execution of a reservation order*

In programming for the registration of a reservation or a sale number, three cycles of the drum are required. These cycles have to be counted in order to limit the various operations to different revolutions. Thus a revolution counter consisting of two digit orders 110 and 110a, Fig. 14, is used. This counter is advanced by the 1/R pulse and is reset after completing a third revolution.

Assuming that the agent is requested to reserve a certain number of adjacent space units of a particular category, he can attempt to do so without knowing positively that the wanted number of adjacent spaces is available. He can also proceed without knowing the location of such a group of adjacent available spaces. Eventually in carrying out this order he will be given information from a readout of the inventory. This information will show the car number, the category designation, and the reservation or sale number which he sets up in his keyset, the boarding point and expiration date or hour, and a code signal which may be used to instruct the porter as to the makeup of the units, or else, in case of seat reservations in a chair car, a "leg-designating" code, hereinbefore referred to, may be used in making a second sale beyond the point of destination of the first customer. If one or more units have been reserved or sold by an agent (during revolution B of the storage drum) the availability status signal at scanning point #13 is revised accordingly, and for checking purposes this revised signal will be read back during revolution C of the storage drum for the agent's verification.

Counter 110, 110a has two output circuits designated $2^0$ and $2^1$. These are static signal circuits which are applied to the input terminals of four matrices 113, 114, 115 and 116. These matrices are also labeled respectively Rev A, Rev B, Rev C and Rev D, thus giving letters to the successive revolutions. There are four combinations of the digit signals as delivered by the counter each representing one of the three revolutions of the drum and a phantom revolution Rev D. Revolution D is called a phantom because, although it starts out as though it were a 4th revolution, it is immediately cancelled and the counter is reset by a signal from the output terminal of the matrix 116. Therefore, the 4th count exists only long enough to perform the resetting operation upon the counter 110, 110a. Each matrix of the group 113–116 is controlled by a particular combination of the output circuits $2^0$, $2^1$, and inversion of those signals as obtained through inverters 111–112. Each matrix is therefore enabled to deliver its static output pulses exclusively during one of the three drum cycles to be counted.

Programming requirements for registering a reservation of one or more space units are inclusive of all that has been described with reference to an availability search, and other requirements which relate to the counting of cars in the train up to the point where availability is found, also counting categories in the car where such availability is found. There are two sets of counters 117a, 117b for the car-no.-in-train, and counters 118a, 118b for category-in-car. Counters 117a and 118a are conditioned to operate only during Rev A. Counters 117b and 118b are likewise conditioned to operate only during Rev B and Rev C and up to a certain point in these revolutions at which the scanning of available space units has been completed. At that instant during the first revolution (Rev A) counters 117a and 118a are frozen. The object of this freezing operation is to send out signals from comparators which are to be used for starting a write-in operation to record all necessary data with respect to the space units to be reserved. This write-in operation takes place during the remaining portion of the 2nd revolution (Rev B). The third revolution (Rev C) is used exclusively for check-back purposes.

*Necessary controls for reservation programming*

The keyset inputs to be utilized in addition to the train plate control are those which comprise the setup of relays in units 101, 102, 24a and 104 to 108 inclusive, Fig. 14. These units are all labeled as to their function.

The programming unit 32, indicated in Figs. 2 and 14, delivers a start signal which enables the output from the 1/R pulse amplifier 35a, Fig. 14, to be delivered to the revolution counter 110, 110a. After this start signal is received all of the registers for transient storage are loaded during Rev. A. Some of these loadings are of no interest at this time, however, since in most cases they relate to previous and irrelevant registrations. They are of vital importance in the registers which store information regarding new trains, train number, car number, category code, availability status and index control signals.

At the start of every drum cycle scanning operation the 1/R pulse operates a flip-flop unit 141 to set it as an enabling gate which will statically condition four gates 129, 134, 137 and 148 to respond to dynamic pulses. These gates are used respectively to transmit ICS pulses as needed for the car-no.-in-train counters 117a, 117b, the category counters 118a, 118b and the space unit counters 139, 142. The flip-flop unit 141 is arranged, however, to be reversed by a pulse which in Fig. 14 is shown entering the same at the top, and upon being reversed in this manner at any time during Rev. A, it disables these four gates and causes the counter registrations to be frozen. The need for performing this freezing operation will be further explained after describing other functions to be performed.

The setup of relays under control of the keyset is substantially the same as for making an availability check but with these additions: the reservation number is set into the keyset and operates relays of the group 104. Under timing control by the programming unit 32, the effect of this storage is recognized by the digit register group 44 in which the reservation number to be used becomes stored. Digit setters (Fig. 10), though not shown in the diagram of Figs. 14 and 15, are used for this purpose. The timing control will be explained later with reference to Fig. 16.

At this point it may be of assistance to outline briefly the principal steps of operation of the equipment for executing any of the three types of calls other than an availability search, these types being capable of initiation at the ordinary agent's keyset. There are the following counters which must be advanced during the processing of these three types of calls, viz. Reservation, Sale and Cancellation:

(1) Revolution counter 110, 110a, counts three revs. and resets.

(2) Train # in Chan counter 39, counts ICS for new trains.

(3) Car no.-in-train counter 117a, counts only when scanning selected train; counts to freeze point during Rev. A and holds its setting until end of Rev. C.

(4) Car no.-in-train counter 117b, counts only when scanning selected train; counts in Rev. B to obtain coincidence with 117a. Is reset by 1/R pulse.

(5) Category counter 118a, counts categories in each car during Rev. A to freeze point. Is reset by New Car signals, and New Train signals.

(6) Category counter 118b, counts categories in each car during Rev. B to obtain coincidence with 118a.

(7) Space unit counter 139, counts space units in each category during Rev. A to freeze point. Is reset by New Category signals, New Car signals and New Train signals.

(8) Space unit counter 142, counts space units in each category during Rev. B to obtain coincidence with 139 count reduced by no. of space units wanted, the subtraction being performed by arithmetic unit 140. Is reset by New Category signals and by 1/R pulse.

(9) Adjacent space counter 119. Counts consecutive available spaces to the number wanted, both in Rev. A and Rev. B. It determines the freeze point during Rev. A and gives out a "Stop-writing-signal" at some moment during Rev. B. Its reset circuit responds to Unavailability signals and to ICS signals other than "New Space."

The overall effect of making comparisons as between the counter advancements during Rev. A and Rev. B respectively is to determine availability of the number of spaces wanted, and to fix the point at which writing of new information is to commence. Rev. A is used to locate the requisite number of available adjacent space units. Rev. B time is used to recognize the location established in Rev. A; to alter the availability status recording at scanning point #13; and to post other information within each scanning point block pertaining to each space unit that is reserved, sold or cancelled. Rev. C time is used to compose and transmit answer-back signals.

Now to resume the explanation of programming to record a reservation, the circuitry for execution of this type of call will next be considered. Much of the circuitry is used in the same manner as for making an availability search, but with additional functions to be performed, particularly so as to coordinate the scanning operations in three successive revolutions of the drum.

*Operations during Rev. A for a reservation call*

Upon the initiation of the start signal by the programming unit 32, the first 1/R pulse from the amplifier 35a is gated to the revolution counter 110, 110a. Rev. A matrix 113 is then enabled to deliver a static output potential throughout the first revolution. The programming unit 32 turns on the read amplifiers 37. The 1/R pulse resets the scanning point counter 49 and the scanning of the selected channel on the selected drum commences. The readout of the bit-recordings is distributively allocated to appropriate groups of digit registers as shown and described in reference to Figs. 2 and 3. For the purposes of a reservation call the readout during Rev. A could be restricted to scanning points #13 and #12 if we chose to enable corresponding gates 65 for just these two scanning points and to inhibit the remainder of the gates 65. Whether or not we do this during Rev. A is unimportant for the reason that if a read-out of data is stored transiently in certain registers and that data storage is not to be utilized in executing the call, then, at least for the programming during Rev. A to cover a reservation call, the scanning operation can be the same as for an availability search, and all loadings of irrelevant data into unused registers can be ignored.

During the scanning operation the effects of reading ICS signals at all scanning points #12 will be such as to suitably characterize the advancement and/or resetting of counters (2), (3), (5), (7) and (9), so parenthetically referenced in the above given tabulation.

(2) It will be recalled that when we described the procedure for making an availability search it was shown to be essential to count ICS signals representing Train in Chan. and to advance the counter 39 accordingly until the count therein was in agreement with the Train in Chan. signal as stored in the relay group 101 under control of the train plate at the agent's set. The coincidence in this respect is always recognized by the comparator terminator 109 for every type of call. The output of a static potential from CT 109, as previously explained, enables matrices 125 and 131 to pass signals only during the scanning of a portion of the record channel which pertains to a train diagram for the selected train. The absence of signal from CT 109, that is, the lack of coincidence shown by the comparators, is sufficient to prevent advancement of car #-in-train counters 117a, 117b, also the advancement of category counters 118a, 118b. Furthermore, provision is made for automatically resetting space unit counters 139, 142 at the outset of scanning each new car or new category. So, the effective limitation of counter advancements to the selected train diagram will be apparent.

(3) The car #-in-train counter 117a responds only to an ICS of the code 1 0 1 1. In the usual recording of a train diagram this signal will first appear at the end of the recordings for all space units in the first car. Hence counter 117a (also counter 117b) always registers a car count which is one short of the number of cars counted. Nevertheless the requirements for finding coincidence between the two counts, counter 117a versus counter 117b, as made in Rev. A and Rev. B respectively are fully met. The binary digit orders $2^2$ and $2^1$ of the ICS code 1 0 1 1 are sufficient in themselves for controlling the advancement of the car counters 117a, 117b. This control is obtained by passing the negative potential pulse of digit $2^2$ directly to matrix 125 and by inverting the positive pulse of digit $2^1$ and passing its inversion to the matrix 125. Now, assuming that we are scanning the selected train diagram, matrix 125 receives a negative potential pulse from CT 109, thus enabling the matrix 125 to deliver a static output pulse for advancement of one or the other of the car counters 117a and 117b. This pulse is passed first to a gate 126 which opens only in response to a dynamic pulse from one of the gates 65, this particular gate, otherwise referred to as gate 65i, serving to identify scanning point #12 for all ICS readings. The output from gate 126 goes to an "either gate" 128 having two output terminals and having static control from the Rev. A matrix 113. During Rev. A, therefore, the EG 128 passes new car signals to counter 117a, but through a gate 129 which is opened at the start of Rev. A by means of the 1/R pulse. Gate 129 serves when closed to freeze the car count in counter 117 when the wanted number of available space units has been found. Thus the count registered will be held throughout Revs. B and C and will be erased by a reset pulse from Rev. D matrix D, that is at the completion of this type of call.

(5) Category counters 118a, 118b are advanced in a manner similar to that described above for car counters. They respond to ICS signals for new train, coded 1 1 1 1, or for new car, coded 1 0 1 1, or for new category 1 0 0 1. In each of these codes the digit $2^0$ is "1," so this digit alone is sufficient to advance the category counter 118a for each new category during Rev. A. The stepping pulse is derived dynamically from gate 65i, that is at scanning point #12, and is used to open gate 138, but only when the latter is conditioned by a static pulse representing "1" of the digit $2^0$ in the ICS. The output from gate 138 is passed to an either gate 135 and is directed, if within the scanning cycle of Rev. A, into category counter 118a, otherwise into category counter 118b. An output pulse from matrix 113 (Rev. A) gives this direction, but the dynamic pulse also passes through a gate 137 and thence to counter 118a. Four gates 129, 134, 137 and 148 are commonly controlled so as to be opened by a flip-flop circuit 141 during a portion of the Rev. A cycle and until the counters need to be frozen. Thereafter these counters become frozen, since the three gates are closed. Note that flip-flop 141 delivers a gate-opening pulse when set by the 1/R pulse at the start of Rev. A, and when the flip-flop is set to the other stable condition, that is, upon finding available space units to the number wanted, this action determines the so-called freezing point of Rev. A, or the fixation of counts in the car, category and space unit counters. The category counter 118a responds to a reset signal which emanates from digit order $2^1$ of the ICS, provided this digit is a "1," as is the case for new train and new car codes. This reset signal traverses gate 149, gate 134 and EG 147, the latter being effective under control of Rev. B matrix to transfer this reset signal from counter 118a to counter 118b. Since the ICS signals of all types produce similar advancements of the counters during Rev. B with respect to those of the counters actuated during Rev. A until the freezing point is reached, it will be apparent that a corresponding scanning point can be found as a point at which to start writing in Rev. B, and this point will be evidenced by the manifestation of the necessary coincidences between corresponding counters.

(7) The space unit counters 139 and 142 are also advanced in Rev. A and Rev. B respectively and in the same manner as described above in reference to the car and category counters. Every gating pulse which comes through gate 65i (at scanning point #12) is used to advance counter 139 during Rev. A as long as gate 148 is held open by the flip-flop 141. With slight delay that is inherent in the output of the ICS register 48 and the digit $2^0$ when characterized as a "1" for control of the category counter advancement, the effect of the latter signal is extended to the space unit counter 139 to reset the same whenever a new category of space units is to be scanned.

*Adjacent space counter*

The operation of the adjacent space counter 119 was explained when describing its function for making an availability search. The operation is exactly similar when making a reservation. An output pulse from the availability status register 50 is delivered whenever a space unit within the selected category is found to be of available status. The counting pulses are delivered by the "either-gate" 150 to the adjacent space counter 119. If the count itself reaches that of the wanted space units as stored in the relay group 102, then we have an output which is delivered to the comparator terminator 130 and thence to the matrix 131 for conditioning gate 133 to open only in response to the #12 pulse.

Upon reaching simultaneous coincidence of Train # in Channel (CT 109), available space count (CT 130), and category choice (also conditioning CT 130 when relay 132 is operated by the programming unit 32), the matrix 131 conditions gate 133 to respond to the next #12 pulse and to deliver its output to the previously described flip-flop unit 141, and at the same time to the transient storage unit 121. The result of reversing the flip-flop unit 141 at the time of reaching these simultaneous coincidences, as shown by the several comparator terminators, is to close gates 129, 137, 148 and 134 so that no further accumulations of ICS counts shall take place for the remainder of Rev. A.

*Operations during Rev. B*

At the commencement of Rev. B, matrix 114 will deliver a static output signal, but the previously delivered output from matrix 113 will cease. As for the cessation of the output from matrix 113, this will cause a shift of output from the "either-gate" 128. Thereafter the car-No.-in train-counter 117b will count index control signals of the code 1 0 1 1 while the count stored in counter 117a remains frozen. Similarly, the count of new categories is shifted by the "either-gate" 135 in the absence of a static control from matrix 113 so that the new category signals will operate this gate to deliver its output to counter 118b instead of counter 118a. Thus, during Rev. B the new categories will be counted for obtaining a comparison between these counts in the two revolutions of the drum. With respect to the straight counting of space units within each category group, regardless of whether or not they are available, the output from the "either-gate" 136 is shifted during Rev. B so that the count of these space units shall be delivered to counter 142 instead of the counter 139.

It will be noted that there are code unit conductors leading out of the space-units-wanted relay group 102 and these conductors are branched to the arithmetic unit 140 for the purpose of setting in this unit the number of space units wanted. This insertion of the number is made subtractive because we need to start a writing operation for recording of all necessary data respecting each one of the reserved spaces at some point previous to the point where the counter advancements were frozen during the first revolution. For example, if three spaces were to be reserved, then the freezing point for these counters would be reached after the third available space unit was scanned. However, the writing operation must begin with the first one of these three space unit scannings. So, whenever the count of space units may be stored in the counter 139 it is necessary to subtract the number of space units wanted from this number. This is the prime function of the arithmetic unit 140. Such an arithmetic unit is similar to that shown in Figs. 6 and 7 of the aforesaid Connolly et al. application, Serial No. 232,548, filed June 20, 1951.

It will now be shown that during Rev. B it is possible to start writing new information into the drum respecting the reservation number and all correlative data, the amplifier 38 being conditioned to do so by the programming unit 32, but only after the "start-writing" signal has been delivered by the comparator terminator 144 which combines the effects of all the primary comparators, and which operates under joint control of the several comparators. When Coincidence is established in this manner during Rev. B the "start-writing" pulse is delivered through conductor 156 to the programming equipment unit 32 and causes an output signal to be delivered therefrom for the read-write amplifier control purpose.

To review the operations in Rev. B as so far described, it will be seen that the first part of the cycle from its 1/R pulse starting point to the scanning point corresponding to where the counters 117a, 118a and 139 were frozen during Rev. A consists in duplicating these counts during Rev. B by advancement of counters 117b, 118b and 142. This repetitive operation during the first part of Rev. B provides the basis for count comparisons in the two cycles. When the associated comparators for matching the counts in the two cycles reach agreement, then the comparator terminator 144 delivers an output pulse which signifies this agreement. The programming equipment utilizes this pulse as a starting point for writing all necessary new information as stored in the relay groups 102, 24a and 104 to 107 inclusive. This writing operation has to be stopped after reaching a scanning point along the magnetic tracks beyond the last of the space unit blocks with which a particular call is concerned. In each space unit block as defined by scanning points #23 down to #12 inclusive revised recordings will need to be entered, according to the number of such accommodation space units to be reserved, sold or cancelled. The programming procedure for executing various types of calls will be taken up in due course. Next, however, it will be explained how the information to be recorded can be held in storage while being repeatedly recorded along the magnetic tracks.

*Reiterative writing procedure*

In the execution of calls other than of the availability search type, and whenever a plurality of adjacent accommodation space units is involved, it becomes necessary to re-circulate the statistical data that is transiently stored in certain of the digit register groups, particularly 44, 45, 46 and 47. The recirculating procedure enables multiple digit code signals stored in these register groups (shift registers) to be fed out from output terminals thereof and conducted simultaneously to the write amplifiers 38 and to the input terminals of the same register group. The four register groups just mentioned and six other groups viz., 40, 41, 42, 43, 48 and 50 comprise the quota of such groups as are provided in the illustrative embodiment of our invention herein shown and described. Of the six groups last mentioned all but register group 50 are provided for permanent storage of identification signals respecting the framework of the train diagram, although register 41 for category status registrations is subject to the entry of current changes from time to time by the master agent. Register 50 receives write-in signals to show availability status changes due to the execution of any reserve, sell or cancel order. This register, however, stores only one four-unit code combination which remains in storage until supplanted by a newly injected availability status signal. To record this signal on the drum does not disturb the register storage.

In the foregoing part of the specification matters have been dealt with which were best supported by the drawing, the figures of which, as then referred to, did not include as much detail as should now be set forth, and right here with reference to Fig. 18 which is especially drawn to illustrate the principles of reiterative writing and re-circulating of data storage, these two operations being concurrent.

The digit register group 46 for the boarding point, as shown in Fig. 18, is illustrative of the other groups requiring re-circulation of their data registrations. This particular group comprises two rows of digit registers 820 and 822 respectively, representing storage capacity for two denominational orders of three-element code signals, and a supplemental row of digit registers 821 which are used during a writing operation for recirculating purposes.

As previously described with reference to Fig. 3, gates 65 operate in conjunction with matrix 60 to provide paths for sync pulses to each of the ten data registers 40 through 48 and 50. The gates 65, considered collectively, operate as an electronic distributor. Said sync pulses are transmitted to only one of the register groups at a time, in proper sequence, and for the purpose of enabling the individual digit registers of a group either to accept data signals from the read amplifiers 37, or to introduce similar information to the write amplifiers 38 for recording on the drum.

It is obviously advantageous to be able to record iteratively statistical data respecting a plurality of adjacent accommodations when making reservations, sales and cancellations. The agent making a call which involves any plurality of adjacent accommodations has only to enter the appropriate data on his keyset once for the entire succession of reiterative recordings to be posted in selected consecutive drum storage areas.

Each digit register group is provided with an either-gate 819 having two input terminals, one marked $s$ for static pulse control and the other marked $d$ for admittance of a dynamic shift pulse. The static pulse control is one which collectively conditions the ten digit register groups 40 to 48 and 50 to operate as data transmitters of signals outgoing to the write amplifiers, but only during the writing period of Rev. B. So this conditioning pulse may be derived from the output of the flip-flop circuit 284 shown in Fig. 17.

The four digit register groups 44, 45, 46 and 47 in which the re-circulation procedure is involved are respectively and successively served with dynamic gating pulses from four of the gates 65 which, in Fig. 3, are marked 65a. These pulses, if applied concurrently with a static pulse of + polarity from the flip-flop circuit 284, that is, during the writing portion of Rev. B, will cause the either-gate 819 to direct the dynamic gating pulses out from terminal $w$ thereof and thence to digit register units 821 and also to digit register units 822, representing two orders of coded decimals. At other times the gate will not receive a static pulse of + polarity and so will direct its incoming dynamic pulses out from terminal *r* thereof and thence to digit register units 820 and 822, also representing the same two orders of coded decimals. At these other times, except during the reading portion of Rev. B, the registers 820 will receive gating pulses for acceptance of read-out signals from the read amplifiers 37.

Register units 820 are quiescent except when read-out pulses are gated into them by the gate 65*a* which times the scanning of recorded bits so as to store their information in proper digit register groups. The board point register 46, for example, is served by the gate 65*a* which identifies scanning points #19 and #18, according to the functioning of the matrix 60. So it receives two successive sync pulses at times enabling it to store the two orders of coded signals in rows 820 and 822 during a read-out operation, or to deliver two orders of coded signals as registered in rows 821 and 822 during a write-in operation. Diodes 823 are used to isolate the gating circuits of registers 820 from those of registers 821 so that, during a read-out, registers 821 will not accept the shift-pulse output from registers 822, and during a write-in operation registers 820 will be quiescent and will neither have any influence upon nor be influenced by the operation of registers 821. The re-circulation process is, therefore, confined to writing periods, and the wanted results of the reading and writing processes are maintained distinct.

When information is to be recorded, it is first set up on the agent's keyset, then transmitted to relay storage in the common equipment. Digit setters 156, 157 and 158 are used to transfer the information from relay storage to the electronic digit registers. This transfer process, as will presently be explained, is best performed between two scanning cycles, Rev. A and Rev. B. The information thus transferred must not be destroyed during any part of the Rev. B scanning operation prior to the writing period. So we have provided means for suppressing the read-out of signals that would otherwise garble the transient storage of new data to be recorded. This will be explained later.

It will now be clear that when information is to be reiteratively recorded in portions of the magnetic recording channel which are assigned to space accommodation units covered by a given call, each shift register group is enabled to make a two-way delivery of its data storage bit by bit with successive sync pulses controlling the output from the bottom row 822 while other digits of the data are shifted downward from row to row. Thus, in the case of the two-order registration in register group 46, registers 821 and 822 will have received the new information by use of the digit setters 156. The digits of tens and units orders will be stored in registers 822 and 821 respectively. To start the write-in operation one sync pulse will feed the tens digit out from register 822 and to the write amplifiers 38. After a delay of a few microseconds the tens digits will be shifted to register 821 and the units digit will be shifted to register 822, thus enabling the write amplifiers to receive the output from registers 822 on the next gating (sync) pulse, and then to cause the recording of the units digit. In the case of a recording of a four-order binary decimal number, as may be stored in register group 44, for example, the output signals from the bottom row of the register group will be re-circulated to row 821 and be shifted downward from row to row of the register group until the four orders of digits occupy the same rows as when first entered therein by the digit setters. This will be their storage status at the outset of scanning the channel areas within a subsequent block of bits that relate to an adjacent accommodation space unit. If three such accommodation space units are involved in the call for a reservation, a sale, or a cancellation, then the new data to be recorded in each case will be recirculated three times while concurrently recording that data in successive accommodation space unit blocks.

After making a recording of new information respecting a number of adjacent accommodation space units, a read-out operation will follow during Rev. C, wherein the new data as stored will come back into the storage registers from the read amplifiers in the same manner as has been explained under the heading of availability search. Thus, in the case of the register group 46 the tens digit of the coded number will be stored in the bottom row of registers 822 and the units digit will be stored in row 820. During the read-out operation the row of registers 821 will be quiescent. Following this, at the end of Rev. C a sampling operation can be performed without shifting the information out of the bottom row of registers and losing it. Sampling means, not shown, are well known in the art, illustrative of which is the aforementioned pending application of Connolly et al., Ser. No. 232,548, filed June 20, 1951. Such sampling means usually includes a so-called "relay puller" connected to each unit of the digit registers to be sampled, and gating means to cause each relay corresponding with a respective digit register to be pulled if the register storage happens to be a "1," but to be not pulled if the register storage happens to be a "0." After pulling these relays as selected, they will have their contacts suitably positioned to deliver subsequent answer-back signals. The sync pulse supplied for activating either register 820 or 821 should also be applied, in known manner, as a reset pulse to the other register to provide mutually exclusive control of register 822.

Programming

Figs. 16 and 17 joined together show the principal components which have programming functions and other components the functions of which have to be controlled by the programming equipment. It is unnecessary at this point to refer again to the necessary operation of a seeker switch and the selection processes which are involved in finding the train diagram on one of a number of channels and on one of a number of magnetic drums. The diagrammatic block 32 shown in Figs. 2 and 15 will be understood to include some but not all of the elements here referred to as programming components.

The availability search call

Referring generally to Figs. 16 and 17, and at times to other figures, the steps of programming may be summarized as follows:

Upon placing the call at any one of the agents' keysets, the availability relay 273 is pulled up, giving a start pulse to the flip-flop circuit 281. This is accomplished by discharging a condenser 303 into the input circuit of the flip-flop. Condenser 303 was previously charged from battery 301 through a resistor 302 when contact *a* of relay 273 was against its back contact.

Upon operation of the flip-flop 281 gates 267 and 282 are opened. Gate 267 admits the 1/R pulse from amplifier 35*a* to the revolution counter 110. Gate 282 admits dynamic sync pulses from the sync amplifier 35*b* to the gates of the read and write amplifiers 37 and 38 respectively. The amplifiers in these units are not, however, conditioned to operate without the aid of static potentials which are applied at suitable times for reading and writing.

The output from the revolution counter 110, 110*a*, controls the conditioning of the four matrices each appropriate to a different revolution of the drum, the fourth revolution being interrupted, however, almost at the start so that, in effect, there are only three revolutions for calls of maximum length. In the case of the availability search, the counting is interrupted after the first revolution. At the outset of revolution B, therefore, its matrix 114 delivers a stop signal over conductor 304 to contact *b* of relay 273 and thence to the flip-flop circuit 281. This restores the flip-flop to its normal condition and closes the gates 267 and 282. Another effect of the stop pulse is, however, to operate a delay multivibrator 305 and from it, after a few microseconds of delay, to operate a relay puller 306 which actuates a slow release relay 307. This relay has a contact 308 for closing a circuit to the answer-back device 54, thus supplying signal transmission potential for the answer-back signals. The slow release characteristic of relay 307 is suitably chosen so that these answer-back signals may be transmitted after the completion of revolution A.

The read-out process fills most of the digit registers with transient read-out signals which may be sampled if desired and translated into teleprinter signals. These ordinarily are not essential for the customer agent's use but are used primarily by the master agent for supervisory purposes and to correct the inventories when needed. The customer's agent obtains his information primarily with regard to the availability of space accommodations in any particular category and, in fact, in all of them if he chooses, and with respect to any wanted number of adjacent space accommodations. This matter has already been explained in considerable detail in an earlier chapter. It will be recalled that for each condition of availability in each category if the wanted number of space units is available, a sampling circuit will be established by relay pullers in the unit 121 (Fig. 15) so as to prepare the necessary answer-back circuits 54 for transmission of signals to the several category designating lamps 24 on the keyset (Fig. 1).

Reserve call

Under keyset control, at the start of placing this call, relay 274 at the central station is pulled up. The movement of its contacts a from back to front contact causes a start signal to be applied to the flip-flop 281 the same as for other types of call. Gates 267 and 282 are opened so as to fulfill their functions, the same as for an availability search. The read amplifiers 37 are first conditioned to operate, and when scanning commences the reading heads will deliver their read-out signals unimpeded in any respect during revolution A. This is true because a conditioning static potential is applied to the reading amplifiers and gates from an inversion by inverted 28G of the then normally set flip-flop 284 output. This flip-flop can only be operated at some point in revolution B which is automatically determined as the proper starting point for a writing period. The output from inverter 286 is also used to open a gate 67 whereby the variable digits of the index control signal (ICS) may be fully transmitted by gates 69, 70 and 71, these gates being individual to the three lower orders of digits therein. For the purpose of resetting the counter 49, it will presently be shown that the ICS comprises four binary digits when derived as a read-out at scanning point #12, but during reiterative writing periods the ICS has to be simulated and has the uniform code + — — —.

Contact c in relay 274 has a code-composing function. It feeds an enabling potential to a set of digit setters 156 which is associated with the availability status group of digit registers. When a reservation is made the availability status registration for each accommodation space unit must be altered to substitute a code for signifying the reserved status in place of the code which signifies availability. It will be recalled that the availability code is + — — — and the reserved code is — + + +. Of the four digit registers 50 which operate to store the availability status signal, any that are to be set positively by input from one or more digit setters 157 will receive the setting pulse on its input terminal 513, as shown in Fig. 5. As for the remaining digit registers of the four-digit group, these must be set negatively; so the setting pulse will be applied to the reset terminal 518. Availability or the lack with respect to different legs of the through trip is shown by selective control of relays 278 and 279 which can be set by the use of boarding point keys 20 on the agent's keyset. Certain of these keys 20 may be considered within the first leg of the trip while others are within the second leg. So one or the other or both of these relays 278 and 279 may be selected by the agent for designating that the reservation is for accommodations within one or the other or both legs.

We have described at length the process of searching for accommodation spaces of a chosen category. We have shown how, in revolution A, groups of counters 117a, 118, and 139 are advanced in response to the ICS until the comparator terminator 130 delivers an output signal indicating that the wanted number of spaces has been found somewhere during the revolution scanning cycle. The effects of this search are held over until the same group of available spaces has been found in revolution B, at which time the agreement between comparable counters serves to obtain recognition in the comparator terminator 144. As will now be seen by reference to Figs. 16 and 17, this comparator terminator opens gate 283 which is also served by sync pulses from gate 282 and causes the flip-flop circuit 284 to be triggered. Flip-flop 284 normally delivered a minus potential which was used in the inverter 286 previously described, and also held a minus or "off" potential on the write amplifiers 38. Now, however, the change in polarity to a plus value as output from flip-flop 284 determines the point at which reading will cease and writing will commence. The inverter 286 renders the reading amplifier 37 inoperative and the direct positive potential applied to the static terminal of write amplifiers 38 causes these amplifiers to be operative.

At all times except during the writing period initiated by the triggering of flip-flop 284, and until this flip-flop is restored to normal, the gate 67 will be held open for transmission of the full index control signals. During the writing period, however, the output from the inverter 286 is minus and this closes gate 67, leaving only the highest order digit of the ICS to go through gate 68 and disabling gates 69, 70 and 71. This is a condition which enables us to simulate the ICS during the writing period when a readout of the ICS has been cut off, it being unwanted. However, there is no disablement of the input from the 1/R amplifier 35a nor from the sync amplifier 35b.

At the outset of placing a reservation call, the agent, as has been explained, caused his individual key to be inserted in the key receptacle for transmission of two lower order digits of a reservation number. The two higher order digits of this number are also transmitted by means of the stepping switch presently to be described in reference to Fig. 19. The reservation number is stored at the central station by a group of relays designated 104. Digit setters associated with these relays are of two groups, 156 and 158. It is necessary to supply two groups because in the one case now being described the reservation number must be translated into electronic digit registers 44 so that the digit setters 156 may be operated for a reserve call. In the other case which is involved when reservations are to be taken up and converted into a sale, or when they are to be cancelled, the reservation number must be translated into electronic storage in a comparator group 262. Here, the digit setters 158 will be made operative. All digit setting is to take place between the end of scanning in revolution A and the commencement of scanning in revolution B. Due to this timing choice for the digit setter operation it is necessary to suppress the loading of the transient data storage registers during that part of revolution B which may precede the writing period. This is accomplished by disabling gates 65 and 65a so that all digit registers which would need to be used to store the new information obtained from the keyset will be held for storage of that information during this prewriting period of revolution B. The read-out of the ICS during this prewriting period is essential, however. Hence the dynamic output from gate 65, which is delivered at scanning point #12 is led directly to the gating terminals of digit registers 48 wherein the ICS is stored. Disablement of gates 65 and 65a is obtained by means of the gate 289 under the condition which occurs only within revolution B and is also prior to the triggering of flip-flop 284. Assuming that the matrix 288 is required to deliver an enabling output potential to the gate 289 at all times except during the prewriting period of revolution B, and assuming that this enabling pulse is deliverable only when two of its input terminals have negative potentials simultaneously applied to both of them, it will be seen that we have such negative potentials in the one case from revolution B matrix 114 and in the other case from the flip-flop 284 prior to its being triggered. We also have the same condition after the writing period is over but during such period it is immaterial whether any further readout from the read amplifier is obtained.

When executing any of the three types of call Availability Search, Reserve, or Sell Without Reservation, the comparator terminator 130 detects the finding of the wanted number of adjacent space units. The conditions under which comparator terminator 130 so functions exist when relay 145 is not operated. Relay 145 has a contact *b* which, when resting on its back contact, completes a circuit from comparator terminator 130 to the group of comparators 153 where the comparison is made between spaces wanted and spaces obtainable. It will be recalled that the spaces wanted number set up in relay group 102 is transmitted to the comparators 153 and the availability status registers 50 deliver signals representing availability to the "either gate" 150 for advancing the counter 119 if available and for resetting the same if not available. The counter 119 and the comparator group 153 are shown both in Fig. 14 and in Fig. 17. The either gate 150 has a gating control 269 which is shown in Fig. 17 although omitted in Fig. 14 so as not to unduly complicate the circuitry of the latter. Gate 269 is under control of an either gate 270 and the cooperation under different conditions between the three components 150, 269 and 270 is explained as follows:

During Rev. A the static output potential from Rev. B matrix 114 is +, so gate 269 is open and passes such dynamic signals as may be derived from EG 270. During this cycle and continuing through the read portion of Rev. B the flip-flop 284 has a negative static potential output because it awaits to be triggered for the write period. Thus EG 270 is conditioned by this negative potential to direct its dynamic pulses (entering on the left side of the diagrammatic block) outward to gate 269. Said dynamic pulses are then passed to EG 150 where they are switched selectively to one or the other of two output circuits, depending on the potential of the static output from the availability status register 50. If the digit $2^3$ signal from this register is + then availability is indicated. Then the gating pulse generated at the ICS gate 65i traverses EG 270, G 269 and EG 150, going out to the stepping terminal of counter 119 for counter advancement. If non-availability is indicated by the availability register 50, then the output from EG 150 is switched to its other output terminal and is effective to reset all states of the counter 119.

Thus, as described in the preceding paragraph, the programming functions are performed by G 269 and EG 270 during Rev. A and counter 119 is so controlled as to be advanced or reset in accordance with the reading of the availability signals for successive accommodation space units. The operation of counter 119, as explained in an earlier part of the specification, was made clear without mentioning G 269 and EG 270, these components being more closely associated with programming functions. They serve, however, to render the counter 119 receptive to ICS pulses during the write portion of Rev. B, and for the purpose of properly terminating a reiterative write-in program, as will presently be explained, but first, however, the pre-write-in period of Rev. B should be taken up for consideration.

During the course of Rev. B scanning there are two gates 67 and 289, also a matrix or mixer circuit 288 which are called into play. In the pre-writing period it is necessary to continue the read-out of the ICS, but at the same time the read-out of all other information must be suppressed so as not to garble the write-in signals which are introduced into the digit registers at the commencement of Rev. B. The first requirement is met by sustaining the operation of the read amplifiers 37, that is, by continuing the positive static potential output from the inverter 286 until flip-flop 284 is triggered. The ICS are, therefore, fed to the registers 48 at scanning points #12, being gated thereto by gate 65i (Fig. 18). The ICS thus continue their resetting control over the scanning point counter 49. The suppression of read-out signals pertaining to other portions of the scanning operation is accomplished by disabling gates 65 and 65a. These gates derive their gating pulses from the sync pulse generator, but delivered through a gate 289 only when this gate is enabled to do so by a matrix or mixer circuit 288 (Figs. 11 and 19). Matrix 288 uses two input terminals 170 and 171 and two triodes 167, 168 to fulfill this function; terminal 172 and triode 169 being superfluous. Assume that terminal 170 is connected to the output circuit from Rev. B matrix, and that terminal 171 is connected to conductor 287 which is the output circuit from flip-flop 284.

A positive output potential is delivered by matrix 288 if one or both of its input terminals is +. Hence a + output potential prevails during Rev. A and Rev. C. The potential is also + during the write portion of Rev. B. These + output potentials hold gate 289 open to the transmission of sync pulses for gates 65 and 65a at all times except during the read periods of Rev. B, as will be seen by observance of this tabulation:

| Static potential sources | M 114 | F.F. 284 | Gate 289 |
|---|---|---|---|
| Input terminals of M 288 | 170 | 171 | |
| Rev. A Full cycle | + | − | Open. |
| Rev. B Read Period | − | − | Off. |
| Rev. B Write Period | − | + | Open. |
| Rev. B Remaining part | − | − | Off. |
| Rev. C Full cycle | + | − | Open. |

In the above tabulation it will be noted that gate 289 is kept open by the + static potential applied to terminal 171 of M 288 during the writing period. This is necessary in order to suitably collect the new data signals serially from the digit register groups in which they are transiently stored. The digit register groups containing new data information are enabled by the use of gates 65a to deliver their recording pulses at times properly phased with respect to the scanning points appropriate to the several unit groups.

The simulation of the ICS

We have previously mentioned that when the write portion of Rev. B is arrived at for commencing a write-in operation, the read amplifiers have to be disabled by use of a negative static potential from the inverter 286. But the scanning point counter 49 is required to continue functioning, and it is also required to be reset upon every occurrence of its count #12, that is, the time of normal read-out of the ICS. The read amplifiers 35a and 35b (Fig. 14) function at all times of system operation in order to maintain proper phase relations between scanning points and switching of pulses into and out of different digit registers. So the ICS if simulated during write-in periods may be derived from a utilization of the count #12 gated output from matrix 60. Gate 65i accomplishes this and after its output has been suitably delayed in the delay multivibrator 66a it sends a reset pulse through gate 68, representing a "new space" type of ICS. The simulated ICS is so characterized because reiterative writing operations are confined to a series of accommodation space unit groups of bit recordings which are within a single accommodation category. Gate 68 alone formulates the code for the "new space" type of ICS. The last row of data to be read from the storage drum prior to the writing operation of cycle B is that ICS pattern which directly precedes the first accommodation in the contiguous group (one to five) being reserved or sold as directed by the call. It is at this point that agreement between Rev. A and Rev. B counters occurs, thereby inaugurating the writing portion of the remainder of Rev. B. Moreover interpretation of this ICS is necessary in order to determine how many scanning points must be scanned before the space for the first digit to be actually recorded, i.e., highest order of reservation number, is reached. The separation between last read ICS and first (to be recorded) reservation number digit varies from contiguity (new space) to seven scanning points (new train) as may be recalled by reference to the mapping of Fig. 9. Hence, counter 49 will be reset to the proper count in accordance with instructions derived from the last read ICS and actual recording will commence as the scanning point #23 (Fig. 9) is reached. The reset pulse for counter 49 occurs intermediate between two sync pulses, so has to be effective in obtaining a start counting position one step back of the position of advancement for the first recording pulse. Subsequent to the recording of the data respecting the first accommodation space unit reiterated recordings will be made, assured of proper location by using the simulated ICS to reset the counter 49 always to scanning point #23.

It is necessary to inhibit the use of three gates 69, 70 and 71 during the writing period so that no residual storage of code elements of an ICS as read out before the "start writing" pulse is received will cause a departure from the wanted uniform effects of resetting counter 49 under control of the simulated ICS. Gates 69, 70 and 71 are, therefore, inhibited by disabling gate 67 so that it blocks the passage of the dynamic pulses that would otherwise operate to vary the coding of the simulated ICS. The negative static output potential from inverter 286 has this blocking action upon the gate 67 during the write-in period.

*The control signal for terminating the writing period*

This signal is obtained by providing a secondary use for the space unit counter 119. We have already shown how this counter serves to locate a wanted number of adjacent available space units. That function was performed during Rev. A. Now during Rev. B and only during the write portion thereof we transmit a static + potential from the flip-flop unit 284 through conductor 287 to EG 270 and cause the latter to switch its dynamic pulse output to the terminal at the bottom of the diagrammatic block and thence to the conductor which leads to the stepping terminal of counter 119. All gating pulses for the ICS delivered by the gate 65i are thereupon transmitted to the counter 119 without regard for availability status or the control of EG 150. As for the latter, it is disabled by closure of gate 269, which derives a negative static potential during Rev. B from matrix 114, and is also inactive during the write-in period of Rev. B because it receives no dynamic pulses from EG 270.

Relay group 102 at the central station always stores a code signal representing the number of space units wanted, this signal being derived from the agent's keyset at the outset of placing a call of any type. Counter 119 is advanced by successive applications of dynamic pulses from gate 65i during the write-in period. These dynamic pulses commence with the first to be passed through EG 270 after commencement of the write-in period. When coincidence is reached with respect to the storage of space units wanted in comparators 153 we derive an output potential from the latter which is recognized in the comparator terminator 272 having a connection thereto. CT 272 now enables a gate 285 to pass the next sync pulse to flip-flop 284 for the purpose of restoring the latter to its initial state of stability. Thus the writing period is positively ended after performing the reiterative writing operations for any number of space units to be reserved, and in accordance with the previous description of the reiterative writing procedure.

The post-writing period of Rev. B is one wherein the read-out conditions are restored to what they were during the pre-writing period of the same cycle, but this matter is of no concern to the execution of a call, since the writing process has only to be confirmed by the answer-back equipment in accordance with a read-out obtained during Rev. C.

*Check-back programming during Rev. C*

It is desirable to obtain a read-out of the newly recorded information and to operate the answer-back equipment including the miscellaneous sampler gates 264, the answer-back circuits 54 and associated components 55 and 56.

For the purpose of check-back signaling and the use of programming equipment relating thereto we have provided certain electronic components and relay circuits which are operable only during the Rev. C cycle. Referring to Figs. 16 and 17 these components include a matrix 313, an inverter 314; a relay puller 316 operable to energize a relay 79, whereby +B anode potential is supplied commonly to numerous relay pullers each operatively associated with a data sampling unit; a flip-flop circuit 318 and two gates 315 and 319.

Although we are still describing programming operations in connection with the execution of a reservation order, the Rev. C cycle has substantially the same characteristics of programming for all types of calls other than the availability search. Having recorded the reservation number during Rev. B against the wanted number of space unit blocks of scanning points, we now find the first one of those blocks by obtaining coincidence between the relay storage of the reservation number in relay group 104 and the kaleidoscopic registrations of reservation numbers in the digit register group 44, Fig. 15. The comparator 262 at all times reflects the pattern of the registration number stored in the relay group 104.

The coincidence mentioned in the preceding paragraph serves to cut off the flow of read-out signals into the digit registers as soon as the scanning operation reaches the next ICS, that is at the end of the scanning point block for the first accommodation space unit that is reserved. At that instant the following conditions should and will prevail if the call has been correctly executed:

(1) The program is in Rev. C.
(2) The scanning point has been found in the right Train # in Chan.
(3) The designated category has been reached.
(4) The reservation number has been identified.

All of the comparator units of the category choice group 141 and of the reservation number group 262 have their output terminals 707 (Fig. 7) interconnected, and the necessary anode potential is fed to these units from terminal 189 (Fig. 13) of comparator terminator 263 (Figs. 15 and 16). The output from CT 263 goes to matrix 159 which has a second static input from the Train in Chan. CT 109. When all the inputs to M 159 are negative, indicating agreement in all respects between the read-out from the drum and the key-set-controlled relay storage as to Train in Chan., Category Choice, and Reservation No., the output from the matrix 159 becomes negative and enables a following matrix 313 to deliver a negative potential, provided, however, that the scanning operation is within Rev. C, that is, when matrix 115 delivers a negative output potential through conductor 80 to matrix 313. An inverter 314 gives a positive static output when the output from M 313 is negative.

A relay puller 316 responds to the positive signal so derived. Relay 79 is then energized and applied +B potential through conductor 317 to the several relay pullers which are used for digit register sampling. Fig. 3 shows block diagrams of a number of samplers identified by legends, each operatively associated with a digit register group.

The positive output from inverter 314 is also used to turn on a gate 315 (Fig. 17), thereby enabling the latter to pass the next ICS from gate 65i to a turn-off terminal of a flip-flop circuit 318. This flip-flop circuit has a turn-on terminal which enables it to be normally conditioned for delivery of a static positive signal to a gate 319 in the sync. pulse line. The turn-on pulse for F.F. 318 comes through a capacitor 81 and is obtained from the output of F.F. 281 at the instant when a start pulse is applied thereto.

The results of operation during the Rev. C cycle can now be summarized as follows: The cycle is characterized from the start as a read-out scanning operation. The kaleidoscopic loading of the several digit registers continues until the matrix 159 recognizes the full agreement between all items which are mutually compared. Up to that instant the transient storage in certain of these registers will reflect the information which prefaces the scanning point block for the first accommodation space to be reserved and also the reservation number thereof. The magnetically recorded data at scanning points 30 through 20 will be thus stored in the digit registers 40, 42, 43 and 44. The coincidence signal applied to relay puller 316 then causes relay 79 to be operated. All the sampling relay pullers associated with these four registers are momentarily operated for the purpose of translating the rigit register settings into relay storage. Other relay pullers associated with digit registers 45, 46, 47 and 50 also function during the scanning for read-out at scanning points 19 through 13 of the space unit block wherein the coincidence was established. The next scanning point #12 gives the ICS which in conjunction with the enabling static potential from inverter 314 causes gate 315 to deliver the turn-off signal to F.F. 318. The output of a negative pulse from F.F. 318 closes gate 319 so that no further sync. pulses shall be delivered anywhere. This automatically locks up all registrations in the digit registers and stops the advancement of the scanning point counter 49.

By interrupting the flow of sync. pulses in the manner just now described it will be clear that all timing gates used to inject read-out signals into the various digit registers will be disabled for the remaining portion of the Rev. C cycle. This makes it possible to confine the sampling process to the control of the answer-back circuits 54 in accordance with the then stored information in said digit registers. The agent will, therefore, receive on his local printer 56 the necessary confirmation of reservation data as it stands recorded on the magnetic drum in the accommodation space unit blocks pertaining to the execution of his call.

As a desirable part of the sampling process and the transmission of answer-back signals it is obviously possible to provide relay pullers in connection with the counter registers 139 (Fig. 15) whereby the location of the space unit found upon establishing coincidence of the compared data items will be communicated to the agent's printer 56, so that he and his customer may know exactly which space units have been reserved. It will be recalled that in the scanning cycle of Rev. A a read-out of the ICS enables counter 139 to accumulate a count of accommodation space units from the start of any new category group. The counter is also reset upon scanning an ICS which signifies a new category. In Rev. C the advancement of counter 139 will be stopped when the outflow of sync pulses to the devices using them is stopped. Hence this setting of the counter can be sampled in the same manner as is done with respect to the digit registers. Counter 139 is also always reset by any of the ICS which designate "New Category," "New Car," or "New Train," whether this count be obtained in Rev. A or Rev. C.

The type of call, Reservation, is terminated at the end of Rev. C cycle by the functioning of the Rev. D matrix 116. Despite the fact that a portion of this cycle is devoid of accompanying sync pulses, that is, after closing gate 319, the 1/R pulse generator 35a continues to advance the counter 110 normally, so that the stop signal may be delivered as heretofore described.

*The function of relay 132 for exercising category choice*

In the description of the agent's keyset, Fig. 1, translucent keys 24 were said to be serviceable for designating the category of any wanted accommodation space unit or units. Contacts (not shown) closed permutatively by these keys are provided for transmitting a 4-unit code signal to the central station, thereby to set up the storage of a category choice on relays 24a, so as to restrict the execution of an order to that choice. Only when making an availability search, and optionally not then, would it be desirable to omit the restriction to some one category, and hence to generalize the scope of the search. Thus, if a customer's preference or second choice is to be best met by an availability search without restriction, then none of the keys 24 would be depressed and relay 132 (Fig. 14) remain unoperated during the call. The contact closure made otherwise by the operation of relay 132 when a category choice is expressed causes comparisons to be applied to the comparator terminator 130 in addition to those derived from the comparator group 153 pertaining to the search for the wanted number of adjacent accommodation space units. That is to say, with relay 132 operated CT 130 delivers an affirmative signal only when the category choice comparator group 141 recognizes that the scanning is within the chosen category and when the units-wanted comparator group 141 recognizes that the desired number of adjacent space units has been found.

The unrestricted availability search is, therefore, made while relay 132 remains unoperated. Within the scanning times for each category of accommodation space unit blocks along the channel of the train diagram recordings the first group of wanted adjacent space units to be found available gives its signal to the register-and-relay-puller group 121 at a time when the corresponding category designation is transiently stored in the digit register group 43 and is decoded in unit 170 so as to select the proper relay puller 121 to respond to an affirmative signal from CT 130, as has previously been explained in more detail.

The lamps 24 on the agent's keyset are selectively lit, under control of the answer-back circuits 54 to indicate the one or more categories in which availablity exists, as will be recalled. In executing any type of call other than an availability search one category choice will be made, in response to which at least one of the code relays of the group 24a (Fig. 14) will have to be operated. The operating circuit for relay 132 will be understood by those skilled in the art to be closable to an energy source by a contact which is made when any one of the relays 24a is operated, these contacts being disposed in parallel. In the cable 82 there are five conductors four of which are individual to the control of the comparator units 141 for enabling them to reflect the setup of the relays in the group 24a, and the fifth conductor of which marked $x$ is the operating circuit for relay 132. Thus it will be understood that when, as in most types of call, a category choice is expressed, the search or the execution of the call in other respects will be confined to that category choice and no affirmative answer-back signals will be forthcoming unless there is agreement between the category code signal stored in the relay group 24a and the read-out of the category code as stored in the digit register group 43, this agreement being recognized simultaneously by the four comparator units of the group 141. Such agreement has control upon the operation of CT 263 jointly with that of the comparator group 262, as stated in the description of programming during the Rev. C cycle. Also, if relay 132 is operated, the operation of CT 130 will be affected, as shown when describing the Reserve type of call, and as will be again shown in connection with other types of call.

*Unreserved sale*

The programming for this type of call is very similar to that for making a reservation. The fundamental difference lies in the provision of means for posting a status signal signifying "Sold," this signal being applied to the digit registers of the group 50 for Availability Status. The agent calls for the units of space wanted by setting a key 15 on his keyset. The category designation is also made by setting the proper key 24. The sale number, equivalent to a reservation number, is automatically codified by the use of the agent's identification key in the keyhole 10 in conjunction with the stepping switch coder that is coupled to the counter 11. A secondary difference between this type of call and a Reservation call lies in the fact that the expiration date keys 16, 17 and 18 do not need to be manipulated, since there is no significance that can be given to an expiration date or hour respecting a sale. The lever key 27 is tilted upwardly to indicate the type of call as an Unreserved Sale. This causes the unreserved sale relay 275 at the central station to be operated.

Relay 275 has a contact c which serves to codify the availability status signal which should be recorded at scanning point #3 in each accommodation space unit block to be sold. This relay contact c when closed carries a digit-setting potential from source 301 to one, the other or both of the digit setter units $2^1$ and $2^0$, depending on the operation of leg designating relays 278 and 279. Digit setter units $2^3$ and $2^2$ are reset or neutralized. The actual digit setting operation will be applied to the digit register group along with other digit setter operations under common control of the dynamic pulse gating by gate 312, that is, at the commencement of Rev. B, as described in connection with the making of a reservation.

Operations for locating the wanted number of available adjacent accommodation space units will be conducted for this type of call the same as for an availability search during Rev. A. But unlike the availability search the call will be carried through Rev. B and Rev. C in the manner already described for making a Reserve call. Thus the important feature of this type of call as an Unreserved Sale is that the recording of an appropriate characterization of the availability status signal is effected and the sale number along with correlative data is applied by keyset control to the digit registers through digit setting. Thereupon in Rev. B this information is recorded and in Rev. C it is played back through the answer-back equipment.

*Reserved sale type of call*

This type of call is distinguished from an unreserved sale by the fact that a previously recorded reservation number must be looked for instead of looking for availability of adjacent space units. So the agent sets up the reservation number on his keyset by means of keys 12. The category choice is designated by depression of the proper key 24. Other keys are also depressed the same as for a reservation except that it is useless to repeat a set-up of keys 16 and 17, these referring to expiration date or hour. The type of call key 27 will now be drawn downwardly in order to actuate relay 276 at the central station.

The contacts of relay 276 function thus: Contact a supplies a start pulse to F.F. 281. Contact b will communicate a stop pulse to the other terminal of F.F. 281 when matrix 116 for Rev. D is caused to deliver the same at the end of the call. Contact c composes an availability status signal designating Sold, the codification being the same as for the Unreserved Sale call. Contact d causes relay 145 to be energized, the result being to modify the programming during Rev. A and Rev. B cycles in order to identify the location of the space units previously reserved.

The reservation number as transmitted from the keyset to relays of the group 104 is communicated at the commencement of the call to the comparator group 262. Likewise the category choice relay group 24a is communicated to the comparator group 141 and relay 132 is operated. The space units wanted relay group 102 functions only to control the reiterative writing procedure during the writing period of Rev. B, the same as when executing calls for a reservation and for an unreserved sale. It is then that the counter 119 functions under control of ICS stepping pulses, as previously explained, and determines the point of agreement between space units wanted and reiterative recordings counted. This count, as made in counter 119 for purpose of comparison, determines the time for ending the writing period within Rev. B, as has been previously explained.

Upon reaching agreement in the comparator 262 between the reservation number stored in relays 104 and the read-out of the first registration number of a group of adjacent accommodation spaces as stored and registered in the digit register group 44 the comparator terminator 263 will recognize this agreement. At the same time the category choice comparator group 141 should show agreement between the storage on relays 24a and the read-out of the last previously scanned and stored category designation as registered in digit register group 43. A coincidence signal will then emanate from matrix 159 and pass through a front contact and mating movable contact b of relay 145 to comparator terminator 130.

The operations of the system relating to the establishment of the freeze point in response to an output potential of negative polarity from CT 130, the output from CT 109 being at the same time negative, and other conditions prevailing as described for the fixing of the freeze point in making a reservation, all during Rev. A, are no different from what is done in that type of call, except that the reservation number serves to establish the primary coincidence rather than the count of available adjacent space units. Counters 117a, 118a and 139 will be frozen upon reaching the ICS following the first of the reserved space unit blocks.

The procedure during Rev. B is also similar to that which has already been set forth in respect to a sale without a previous reservation. In other words, during the reading portion of Rev. B prior to the triggering of F.F. 284 the gates 65 and 65a will be disabled so that no read-out from the read amplifiers 37 will be registered in any of the transient storage registers.

During the writing period, assuming that the sale number will be the same as the reservation number, it can be recirculated and rewritten by the reiterative processes already described in reference to Fig. 18 and this process will only confirm what was previously recorded for these spaces on the magnetic tracks. It will be the practice, however, to record the correlative data concerning boarding point, make up, and other information whenever changes have to be made in comparison with what was set up at the time of making the reservation. In all cases, however, the availability status register 50 will be corrected and the new status signal will be recorded.

*Cancellations*

Whenever it is necessary to cancel either a reservation or a sale, relay 277 will be actuated from the agent's key set. This relay has a similar contact group to that of relay 276. In addition to giving the stop and start signals, its contact c transmits an enabling pulse to digit setter unit $2^3$ of the group 156 which is associated with the availability status register 50. This one pulse causes the register unit of the highest order in the group 50 to be set for indication of the availability status as "available."

The closing of relay 145 operates to find the location of the "reserved" or "sold" space by reference to the reservation or sale number. This number appears during the scanning process as storage in group 44. Of course, the agent will have set up this number in his key set to be transmitted to the relay group 104 and then to be used in the comparator 262 at the time of scanning for coincidence in Rev. A. This operation is the same as when executing a "Reserved Sale" type of call. It may be noted, however, that during the write-in portion of Rev. B it is necessary to utilize the effects of relay storage in group 102 for the purpose of defining the extent of the write operation. The number of space accommodations originally wanted must now be restored to "available" status. Hence counter 119 will be used during the write portion of Rev. B and will enable the comparator 153 to deliver a "stop writing" signal the same as is done with respect to a "Reserved Sale" type of call. This will assure the restoration of the code for "available" as a recording at scanning point #13 and that the correction will be applied to all of the space unit blocks originally reserved or sold.

The codification of the reservation number

Since the central station equipment may be controlled from any number of different keysets upon being seized by one of them as a calling station, it is desirable to codify the reservation number in such manner that the number itself will identify the agent who places the call in each case. Thus two digits of the reservation number may be codified by the use of an agent's key 75 as shown in Fig. 19. Two other digits of the reservation number may also be codified by means of a stepping switch having segments 70 and two brushes 71 and 72. Preferably this switch is of the rotary distributor type with each brush mechanically coupled to a respective one of two drum dials 73 and 74 of a counter. The counter itself is arranged to be actuated either magnetically or mechanically whenever any one of the type-of-call keys is actuated.

The outgoing lines 69 are sixteen in number. A binary-decimal system of codification may be adopted, or any preferred four-unit code such as shown in Fig. 19 may be used alternatively. The lines 69 are extended to relays of the group 104 (Fig. 14) in the common equipment, these relays having their windings all connected to an energy source. The brushes 71 and 72 are grounded in order to complete selecting circuits as they sweep over the segments 70.

Different keys 75 are variously notched in order to transmit signals of identifying significance in two decimal digits, where each digit is represented by a four-unit code. One of the denominational digits is codified by notches on one edge of the key and the other digit by a notching of the other edge of the key. Reversal of the key is prevented by the use of a conventional boss on the keyhole plate 10 which mates with a groove in one side of the key. Although we have shown in the drawing that the units and tens digits are codified by the tumblers 76 when pressed by the key into contact with conductor terminals 78, and against the pressure of coiled springs 77, it will be understood that the two higher order digits may be so codified by the key. In that case the counter and rotary switch would codify the two lower order digits.

The writing of train diagrams from the master agent's keyset

Our data storage and reservation system is adapted to utilize well known means for setting up new recordings of train diagrams on the magnetic drums to replace those which expire from day to day. If the inventory is to be held current for 30-day periods, for example, then today's inventory when it expires will be replaced by one designated for the 31st day ahead. The replacement diagram may be quite different in pattern from that which has expired, since it will usually apply to a train scheduled to depart on a different day of the week. This matter, however, offers no obstacle to the carrying out of the train diagram recording process as we prefer to accomplish it.

Assuming that we have a permanent recording of uniformly spaced magnetized spots in the sync track of each drum, and a single magnetized spot in another track of each drum, then a conventional method of recording index control signals and availability status signals and of blanking out the scanning points which intervene and which are to be used for recording data signals respecting each accommodation space unit would be as follows, for example:

The required equipment will generally include an electronic counter having a binary digit capacity to count the full series of magnetized spots in the sync track. This counter is receptive of stepping pulses generated by the sync pulse amplifier 35b (Fig. 14), this amplifier having a reading head connected to its input circuit and the head being arranged and adapted to scan the sync track. The availability status register 50 has digit setters 157 associated therewith as shown in Fig. 16. Similar digit setters are to be associated with the ICS register group 48, and with all the other digit register groups 40, 41, 42, 43, as shown in Fig. 3, but not necessarily including the groups 44, 45, 46 and 47 which are assigned to the transient storage of accommodation space unit data.

In addition to the equipment mentioned in the preceding paragraph we propose to use comparator means (Fig. 7) and a comparator terminator (Fig. 13) in association with said electronic counter of suitable binary digit capacity. Finally we may provide a step-by-step operated tape transmitter arranged and adapted to use a perforated tape whereon there would be as many as sixteen linear rows of perforations constituting a "word." Twelve of these rows may be sufficient for designating an address and four rows will correspond with the four tracks in any of our recording channels.

Now a perforated tape may be prepared in which each transverse row of holes will be coded to represent an address of twelve binary digits and a four-unit data signal to be recorded at a predetermined scanning point along the course of the train diagram. The recording of a complete train diagram may then be envisioned thus:

Each of the scanning points 30 through 24, also 13 and 12, as shown in Fig. 9 will be identifiable by an address stated in binary code according to the sync pulse count from start to finish of a complete scanning cycle. The sensing means of the transmitter is relatively slow in operation compared with the passage of scanning points along the recording tracks under the record heads. Hence, as a practical expedient, no attempt will be made to record items at consecutive scanning points. Instead, it may be sufficient to operate the tape feed mechanism at a tolerable speed so as to make only a few discrete recordings during each revolution of the drum. As the tape is stepped along for scanning successive rows of address and code signals perforations, the comparator with its comparator terminator will recognize coincidences between the counter settings and the individual addresses of each data item. The sensing of each coincidence will give out a gating pulse whereby the data item itself may be presented to the write amplifier for properly recording it in its predetermined place in respect to the train diagram.

If desired, the method set forth in the preceding paragraph may be restricted to the transcription of ICS codes in their proper places according to addresses stated in terms of the sync pulse counts. When once the location of these ICS recordings has been established by means of a master tape and gates responsive to signals emanating from said comparator terminator, it becomes a simple matter to use a supplemental tape whereon the data items to be recorded at scanning points 30 through 24, and 13 may be given addresses corresponding to the same scanning point numbers as shown in Fig. 9. The counter 49 will then be set in operation. It will enable the gating of write-in signals for the contents of the several digit registers 40 through 43 and 50. Recording of these items will then be similar to what is done in the making of reservation or sale write-in operations. The matrix 60 and gates 65 will then serve to inject the data of the perforated tape into the write amplifiers at times appropriate to each data item, such as train No., car No., category code, and space count within each category, as well as the availability status signal.

General considerations regarding the system

There is little need for using erasing means other than when recording the train diagram from the master agent's keyset. This is due to the fact that spot magnetizations are all of one polarity to represent the digit "0" and of opposite polarity to represent the digit "1." We make no use of neutralized scanning points. In setting up the train diagram it may be useful, however, to erase by blanket, that is, unidirectional, polarization all scanning points to represent "0," and subsequently to record the essential details of the train diagram before releasing the same for customer agent operation to satisfy customer wants. Patent No. 2,611,813 granted to Sharpless et al., September 23, 1952, shows erasing means as a component of their system.

In carrying out our invention we do not wish to be restricted to the use of a magnetic memory for storing the details of the inventory. Equivalent memory devices operating by the use of electrostatic storage, phosphorescent storage, and electron emissive storage elements may be adopted by us if desired without departing from the scope of the invention. Such equivalents are suggested in a Patent No. 2,629,827, issued February 24, 1953, to Eckert et al. Other equivalents which might be conformed to the functional requirements of our system may also be adopted according to the scope of the claims.

The illustrative embodiment of the invention as set forth herein is particularly well adapted to inventory usage and to reservation systems for space accomodations on trains, aircraft, vessels and the like. The invention is also applicable to the storage of inventory data in regard to space reservations in hotels, assembly halls and other gathering places. All such units of space may be regarded as equivalents, wherever applicable, of accommodations in so-called "conveyances" as recited in various ones of the claims. The term "bin" appearing in certain of the claims applies to a unit area or subsection of a storage medium for storing a group of data signals which represents the status of a particular accommodation unit.

It is assumed that those skilled in the art may make many modifications of the circuit arangements shown illustratively herein, but without departing from the spirit and scope of the invention itself.

We claim:

1. An information storage system including a cyclically scannable magnetic signal storage medium having a recording surface on which are stored signals comprising coded discrete signal bits representing coded data with different items of data represented by different groups of code signals arranged in regular succession and in which various ones of the groups respectively vary in the number of scanning points occupied thereby, a transducer device and means for causing continuous relative movement between the recording surface of said medium and said transducer device for scanning purposes, means for generating synchronizing pulses in timed relation with the scanning movement, said stored signals including variably spaced index control signals along said surface at scanning points each of which separates two of said groups of code signals, an electronic counter normally operable through a certain range of counts under control of said synchronizing pulses, a source of incoming signals and programming apparatus controlled thereby, electronic circuit control means including said transducer device arranged and adapted to scan said recording surface at will for read-out and at will for write-in of signals representing said data, as determined by said programming apparatus in response to said incoming signals, a plurality of groups of transient signal storage units each group being specifically assigned to a particular class of said data, distributor means for successively conditioning each of said storage unit groups either to accept readout signals or to deliver write-in signals as determined by said programming apparatus and according to the instants of scanning appropriate points along said surface, means for utilizing the coded significance of said index control signals when scanned for variably resetting said counter to different numerical settings from which counting proceeds, and circuit means controlled by said counter for causing said distributor means to slectively condition various ones of the several transient storage units to appropriately receive or to deliver signals representing said coded information, notwithstanding variations in the number of scanning points taken up by different groups of said code signals.

2. A system according to claim 1, in which said distributor means comprises a matrix having separate output control circuits for successively conditioning each of the said transient signal storage unit groups, and circuit means for causing said electronic counter to act upon the matrix for enabling the several transient storage units to appropriately receive or to deliver said coded information.

3. A system according to claim 1, in which said distributor means has a plurality of output circuits including electronic gating means for delivering gating pulses selectively to said transient signal storage units, different ones of the gating circuits being selected according to the counts of said electronic counter, and counter reset means operable by the different ones of said index control signals when gated out for causing the counting cycles of said counter to be started from correspondingly different numerical settings.

4. An information storage system comprising magnetic recording and read-out equipment including a magnetic storage medium having cyclically scannable record tracks, scanning heads and means for causing continuous relative movement between the storage medium and scanning heads for scanning purposes, means for generating synchronizing pulses in timed relation with the scanning movement, said record tracks having discrete signals magnetically stored thereon representing coded data with different items of data represented by different groups of code signals arranged in regular succession and disposed on a plurality of said tracks collectively comprising a channel and in which various ones of the groups respectively vary in the number of scanning points occupied thereby, said stored signals including variably spaced discrete index control signals along said channel at scanning points each of which separates two of said groups of code signals, an electronic counter normally operable through a certain range of counts under control of said synchronizing pulses, a source of incoming signals and programming apparatus controlled thereby, electronic circuit control means including said scanning heads arranged and adapted to simultaneously scan the tracks of said channel at will for read-out and at will for write-in of signals representing said data, as determined by said programming apparatus in response to said incoming signals, a plurality of groups of transient signal storage units each group being specifically assigned to a particular class of said data, distributor means having separate output control circuits selectively operative for successively conditioning each of said storage unit groups either to accept read-out signals or to deliver write-in signals as determined by said programming apparatus and according to the instants of scanning appropriate points along said record tracks, means for utilizing the coded significance of said index control signals when scanned for variably reseting said counter to different numerical settings from which counting proceeds, and circuit means controlled by said counter for causing said distributor means to condition the several transient storage units to appropriately receive or to deliver signals representing said coded information, notwithstanding variations in the number of scanning points taken up by different groups of code signals.

5. A system according to claim 4, in which at least one of said code signals has the code units thereof disposed serially along a portion of one of said plurality of tracks comprising a channel, and others of said code signals have the code units thereof disposed transversely in the others of said tracks and opposite said linearly-disposed code units, and including circuits controlled by said electronic counter and distributor means for differentiating between the aforesaid two types of code signals during a scanning operation.

6. In a reservation system for maintaining an inventory of accommodations, a storage station including a cyclically scannable signal storage medium having a recording surface for storing signals comprising coded discrete signal bits representing the reservation status of the individual units of space in different categories of accommodations on a plurality of trains or other conveyances, transducer apparatus for effecting write-in or read-out of signals and means for causing continuous cyclic relative movement between the storage medium and transducer apparatus for scanning purposes, means for generating synchronizing pulses in timed relation with the scanning movement, a calling station having means for generating signals representing an inquiry as to the availability of one or a desired plurality of units of space in a particular category of accommodations on a particular conveyance, means including selector apparatus at the storage station responsive to the signals from the calling station and controlled by said synchronizing pulses for locating and scanning that portion of the storage medium where the code signals representing the desired information are stored and including means for determining whether a desired plurality of adjacent units of space in said particular category are available, means including said transducer apparatus for reading out signals representing the number of adjacent units available as scanning proceeds, a counter controlled by said last named signals, means for resetting said counter to begin a new count whenever the number counted is not as great as the number of units called for by the signals from the calling station, means operative in accordance with the result of the availability search for transmitting answer-back signals to the calling station, and means at the calling station responsive thereto for indicating either an affirmative or a negative result of said search as the case may be.

7. A system according to claim 6, in which the calling station has means for generating signals requesting the reservation of one or more available units of space in a particular category of accommodations on a particular train or other conveyance, and the means at the storage station responsive to the last named signals for making an availability search includes means operative in the event of an affirmative result for automatically changing the signals stored on said medium to signify the reservation of a particular one or a plurality of particular ones of said units of space as desired, and means for transmitting answer-back signals in accordance therewith to the calling station to confirm the reservation of said unit or units.

8. In a reservation system for maintaining an inventory of accommodations, an information storage station including a cyclically scannable signal storage medium on which are stored different groups of signals arranged in regular succession and comprising coded discrete signal bits representing the reservation status of the individual units of space in different categories of accommodations on a plurality of trains or other conveyances, transducer apparatus for effecting write-in or read-out of signals and means for causing continuous cyclic relative movement between the storage medium and tranducer apparatus for scanning purposes, means for generating synchronizing pulses in timed relation with the scanning movement, a calling station having means for generating signals representing either a request for the reservation of one or more available units of space in a particular category of accommodations on a particular conveyance or to effect the sale of particular space previously reserved, and including means for generating and transmitting an accompanying particular identification signal individual to each transaction respecting a requested reservation or sale, means including programming apparatus and selector apparatus at the storage station responsive to said signals from the calling station and controlled by said synchronizing pulses for locating and scanning that portion of the storage medium where the code signals representing the reservation status of said space are stored, means including said transducer apparatus selectively operable for changing the stored signals either to signify either the reservation of said space or the sale of the space previously reserved, as determined by said programming apparatus, and for writing in on the storage medium said identifying signals in association with said changed signals when a reservation is effected, and signal generating means at the storage station automatically operative to transmit answer-back signals to the calling station to confirm either the requested reservation or sale effected.

9. A system according to claim 8, in which the calling station has means for automatically generating and transmitting a particular identifying signal individual to each transaction respecting a requested reservation, and means operative to display each such signal at the calling station.

10. A system according to claim 8, in which the calling station has means for generating signals for effecting a sale of particular space previously reserved and including an identification signal individual to said transaction respecting the previous reservation, said selector apparatus at the storage station including means responsive to said signals for locating and scanning that portion of the storage medium where the code signals signifying the reservation of said space are stored, means including said transducer apparatus operative to change said stored signals to signify that said space is sold, and signal generating means at the storage station automatically operative to transmit answer-back signals to the calling station to confirm the sale of said space.

11. A system according to claim 8, in which the calling station has means for generating signals for effecting a cancellation of particular space previously reserved and including an identification signal individual to said transaction respecting the previous reservation, said selector apparatus at the storage station including means responsive to said signals for locating and scanning that portion of the storage medium where the code signals signifying the reservation of said space are stored, means including said transducer apparatus operative to change the stored signals to signify that the previously reserved space is again available, and signal generating means at the storage station automatically operative to transmit answer-back signals to the calling station to confirm the cancellation of said reservation.

12. A system according to claim 8 for effecting a reservation of a desired number of units of space, in which the scanning movement for each such transaction comprises a plurality of successive scanning cycles of the storage medium, and the signals stored on the storage medium include a plurality of index control signals one for each individual unit of accommodation space, means operative during a first scanning cycle for reading out signals including said index control signals representing the reservation status and location of the individual units in a particular category and on a particular conveyance, counting means controlled by said index control signals for determining whether the requested number of such units is available, other counting means operative during successive cycles under control of said index control signals for determining in a second scanning cycle the location of the signals representing the requested number of available units found during the first cycle and including means for locating the starting point for a write-in scanning operation during the second cycle to signify reservation of said available units, said last named means including an electronic computer into which the requested number of accommodation units is subtractively introduced and into which the count of said index control signals is additively introduced for determining said starting point in accordance with the result obtained by the computer.

13. A system according to claim 8 for effecting a sale of a reservation previously made, in which the scanning movement for each such transaction comprises a plurality of successive scanning cycles of the storage medium, and the signals stored on the storage medium include a plurality of index control signals one for each individual unit of accommodation space, means operative during a first scanning cycle for reading out signals including said index control signals and the particular identification signal individual to said transaction respecting the previous reservation, counting means controlled by said index control signals for counting the same up to the point where said identification signal is found, means operative during successive scanning cycles under control of said index control signals for determining in a second scanning cycle the location of the signals representing the said reservation and for locating the starting point for a write-in operation during the second cycle to signify the sale of the reservation, including means for subtracting the digit 1 from the count of said index control signals and determining said starting point in accordance with the result obtained.

14. In a data storage system of the type having a single scannable magnetic storage medium and transducing devices with respect to which said medium is relatively movable, said medium having a recording surface on which is stored an array of variably coded index control signals each comprising a plurality of code units, said signals being spaced in succession along scanning tracks of said medium and also spaced in predetermined relationship with respect to groups of stored bit recordings, each group comprising stored digital data signals respecting a unitary statistical item, certain of said data signals of each group having item identifying significance while others denote a characteristic of the item, a source of incoming message signals relating to one or more of said item groups including signals for identifying said one or more of the item groups, programming means for executing successive scanning cycles for respectively different operations, item locator means subject to control by a concurrent read-out of said index control signals and operable during one scanning cycle for detecting agreement between given item-identifying message signals and a read-out from the storage medium of corresponding signals, said item locator means being further operable during a subsequent scanning cycle to so determine the start of a write-in operation that received message signals shall be recorded by said transducing means within suitably identified bit spaces of the scanning tracks.

15. Apparatus in accordance with claim 14, and comprising means operable only during a second scanning cycle and only during the performance of a write-in operation by said transducing devices for deriving the simulation of an index control signal of fixed codification, whereby said transducing devices are caused to record said message signals reiteratively with respect to a selected succession of said item groups to denote a change in the status thereof.

16. Apparatus in accordance with claim 14, and comprising means including a plurality of sets of electronic digit registers for transiently storing different portions of a bit recording group, a source of synchronizing signals and gating means controlled thereby and coacting with said transducer devices, when they produce a read-out of said index control signals, for effecting an appropriate distribution of signals to different ones of said digit register sets according to the scanning of said different portions of a bit recording group.

17. Apparatus in accordance with claim 14, and comprising a plurality of sets of electronic digit registers and operatively associated digit setters, means operative during an interval which separates the first and second scanning cycles for causing said digit setters to load said digit registers with the storage of said message signals, a source of synchronizing signals and gating means controlled thereby and coacting with electronic switching means for controlling the operation of said transducer devices during a write-in operation, thereby to effect the feeding of said message signals outward from said digit registers and into said transducer devices and to effect a new recording of informational signals within selected group sections of the scanning tracks, said electronic switching means serving to collect the informational signals from different digit register sets successively.

18. Apparatus in accordance with claim 17, and including an electronic counter subject to stepwise advancement in response to said synchronizing signals, and subject to resetting in response to the read-out of said index control signals during periods of read-out by said transducer devices, and also subject to resetting at certain instants during periods of write-in by said transducer devices, and means for deriving a simulation of an index control signal of fixed codification whereby to effect said resetting control at said certain instants, said electronic counter constituting means for maintaining the operation of said switching means in phase with the scanning of said bit recordings, whereby the informational content of said recordings is suitably allocated to transient storage in the respective digit register sets during a read-out operation, and the message signals held in storage in said digit register sets for a write-in operation are suitably allocated to appropriate recording areas according to their relationship thereto.

19. Apparatus in accordance with claim 17, and including means operative during any period of read-out scanning in the second scanning cycle which precedes a write-in scanning operation for blocking the entry of read-out signals into those of the digit registers in which message signals are stored.

20. In a data storage system of the type having a single scannable storage medium and transducing devices with respect to which said medium is relatively movable, said medium having a recording surface on which is stored an array of variably coded index control signals each comprising a plurality of code units, said signals being spaced in succession along scanning tracks of said medium and also spaced in predetermined relationship with respect to groups of digital bit recordings wherein each group comprises stored informational signals in the form of digital coded bits respecting a different statistical item and the status characteristic thereof, certain of said informational signals also having item-identifying significance, a source of message signals including signals for identifying one or more of said groups of items and for denoting the status characteristic of each item and a certain one of several categories under which each item may be classified, programming means for causing a succession of scanning cycles to be performed by said storage medium in cooperation with said transducing devices, item locator means operable during a first scanning cycle for detecting coincidence between any of said item-identifying message signals and a read-out from the storage medium of corresponding signals, said item locator means having means operable during a second scanning cycle for initiating the performance of a write-in operation by said transducing devices, means under control by said item locator means and operable in accordance with the read-out of previously scanned index control signals for causing said write-in operation to be applied to appropriate recording areas on said recording medium within the identified item groups as found during the first scanning cycle, and means responsive to the status-denoting message signals for recording their significance with the aid of said transducing means, thereby to reflect status changes with respect to selected item groups.

21. A system according to claim 20 in which said item locator means includes a plurality of counting devices respectively controlled by the variably coded index control signals, and means for freezing said counting devices in their counting positions when coincidence is detected during the first scanning cycle and operative to locate the appropriate recording areas during the second scanning cycle for the write-in operation.

22. A system according to claim 21, including means for resetting certain of said counting devices to their initial starting positions in response to certain of the index control signals during a scanning operation and prior to the initiation of their final counting operations involved when said coincidence is detected.

23. A railroad reservation system comprising a central station having a magnetic storage medium and transducer devices with respect to which said medium is relatively movable in successive scanning cycles, said medium having stored thereon an array of variably coded address signals respectively representing the identification of a certain train for a particular date, certain cars in said train and particular accommodation units in said cars, each of said signals being composed of a plurality of code units, said signals being spaced along scanning paths of said storage medium and also spaced in predetermined relationship with respect to groups of signals each composed of a plurality of bit recordings, each of said groups comprising a bin of stored data signals respecting one of said accommodation units, certain of the data signals of each bin indicating whether the unit is available or is reserved or is sold, a calling station having means comprising a keyset for composing and transmitting a message having coded address signals respectively representing a particular date, a certain train and a specific category of accommodation space, and accompanied by signals representing a desired number of units of such space and a programming signal to indicate whether the procedure is to be an availability search or a reservation request or a sale in regard to such space, programming means at said central station responsive to said programming signal, means responsive to said message for executing successive scanning cycle operations, means including a selector subject to control by a concurrent read-out of said address signals from the storage medium and operable during one scanning cycle for detecting agreement between said signals and the address signals in the received message and selectively operable under control of said programming means during the said scanning cycle either to determine the start of an availability search without changing the data signals stored on said medium or to determine the start of a write-in operation to change the stored data signals in a selected bin in a manner to signify either that the selected space is reserved or that it is sold, as the case may be, and means for transmitting answer-back signals to the calling station to indicate the result of the selected procedure.

24. A system according to claim 23, in which said keyset has means for transmitting signals for selecting a particular accommodation unit previously reserved or sold and accompanied by a cancellation signal, and means at the central station responsive to said signals for changing the appropriate stored data signals to indicate a change in status from reserved or sold to available.

25. A system according to claim 23, in which said keyset has means for transmitting inquiry signals in regard to a plurality of different categories of accommodation space and accompanied by a programming signal to indicate an availability search, means at the central station for determining the reservation status of said categories, means for transmitting answer-back signals in accordance with the result of the availability search, and means at the calling station responsive to the answer-back signals for visually indicating the result of said search in regard to the different categories.

References Cited in the file of this patent

UNITED STATES PATENTS

| 2,540,654 | Cohen | Feb. 6, 1951 |
| 2,549,071 | Dusek | Apr. 17, 1951 |
| 2,609,439 | Marshall | Sept. 2, 1952 |
| 2,645,764 | McWhirter et al. | July 14, 1953 |
| 2,652,196 | Sterling | Sept. 15, 1953 |
| 2,710,392 | Jammer | June 7, 1955 |

OTHER REFERENCES

"5th Interim Prog. Report on the Physical Realization of an Electronic Computing Instrument" by Princeton Inst. of Advanced Study, January 1949; (pages VIII–1 to VIII–6, and block diagrams I and II).

"Description of a Magnetic Drum Calculator," Harvard Computation Laboratory, Harvard Press, 1952; (pages 21 to 26, 28 to 40).